«12» United States Patent
Yerneni et al.

(10) Patent No.: US 8,977,640 B2
(45) Date of Patent: Mar. 10, 2015

(54) SYSTEM FOR PROCESSING COMPLEX QUERIES

(75) Inventors: Ramana Yerneni, Cupertino, CA (US); Saurabh Sodani, Lone Tree, CO (US); Jayanth Anandaram, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 413 days.

(21) Appl. No.: 13/036,591

(22) Filed: Feb. 28, 2011

(65) Prior Publication Data

US 2012/0221591 A1 Aug. 30, 2012

(51) Int. Cl.
*G06F 17/30* (2006.01)
*G06Q 30/02* (2012.01)

(52) U.S. Cl.
CPC .......... *G06F 17/30867* (2013.01); *G06Q 30/02* (2013.01)

USPC .......... 707/767; 707/693; 707/718; 707/768; 707/793; 707/805

(58) Field of Classification Search
CPC .................................... G06F 17/30805
USPC .................. 707/693, 718, 768, 767, 793, 805
See application file for complete search history.

(56) References Cited

U.S. PATENT DOCUMENTS 7,664,734 B2 * 2/2010 Lawrence et al. ............. 707/767
8,090,625 B2 * 1/2012 Yi ................................. 705/26.7

* cited by examiner

*Primary Examiner* — Sana Al Hashemi
(74) *Attorney, Agent, or Firm* — Brinks Gilson & Lione

(57) ABSTRACT

A method of processing a supply query is described. The method includes receiving a first supply query comprising a first set of attributes. A size of the first set of attributes is compared to a threshold value. A second supply query comprising a second set of attributes is generated when the comparison indicates that the size of the first set of attributes is greater than the threshold value.

25 Claims, 10 Drawing Sheets

SYSTEM FOR PROCESSING COMPLEX QUERIES

TECHNICAL FIELD

The present description relates generally to a system and method, generally referred to as a system, for processing queries.

BACKGROUND

A market exists for the distribution of advertising and other information over data communications and entertainment networks. A non-limiting example is insertion of advertising copy supplied by advertisers, for appearance on web pages, content offered by media distributors such as news and information services, internet service providers, and suppliers of products related to the advertiser's products or services.

Despite the current economic forecasts, the surge in marketing budgets being diverted into digital media continues unfettered. Digital media offers marketers a rapid, highly targeted, interactive, measurable and cost effective route to target consumers, something that may become even more important in times of uncertainty. With huge volumes of webpages being created daily, bringing with them a similar surge of new inventory, online publishers may seek to maximize their yields right across their properties by monetizing both their premium and unsold inventory. At the same time, the inventory may help online advertisers' source new opportunities to target their audience.

This growth is taking place in an environment of continuing media and audience fragmentation. However, it is the increasing complexities of reaching audiences that has driven the emergence of online advertising exchanges to provide efficiencies and reduce the complexities in an incredibly dynamic environment. Hundreds of millions of websites and huge volumes of online advertising are communicated around the world every day.

SUMMARY

A method of processing a supply query is described. The method includes receiving a first supply query comprising a first set of attributes. A size of the first set of attributes is compared to a threshold value. A second supply query comprising a second set of attributes is generated when the comparison indicates that the size of the first set of attributes is greater than the threshold value.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A supply of advertisement impression opportunities may include opportunities to insert on-line advertising ("ad opportunities"). Alternatively and/or in addition, for example, variable banner ads may be inserted into web pages that are transmitted to users. Alternatively and/or in addition, an advertisement or advertiser listing may be inserted into a list of results returned in response to a user search query. Alternatively and/or in addition, for example, an advertisement or advertiser listing may be inserted when a user is playing a game on a web site, a mobile phone, or a smart phone. Alternatively and/or in addition, an advertisement or advertiser listing may be inserted when a user is using an application on a web site, on a mobile phone, or on a smart phone. Ad opportunities may arise anytime a user visits a page, enters a search query, plays a game on a website or phone, uses an application on a website or phone, or uses a search engine. For example, every web site view may be an ad opportunity.

Advertisements ("ads") may be allocated selectively, based on characteristics of the user or typical users of the particular web page, or otherwise selected to match user and content information, location, timing and other criteria to advertiser specifications, for targeting the ads to potential customers.

In a display advertising system, ad campaigns may be booked for a future time period, and as such, the set of matching and/or relevant ad opportunities for a campaign being booked may be forecasted opportunities rather than predetermined or otherwise permanent opportunities. Accordingly, these systems may include a component that forecasts the set of ad opportunities for potential ad campaigns being requested or booked.

Figure 1:
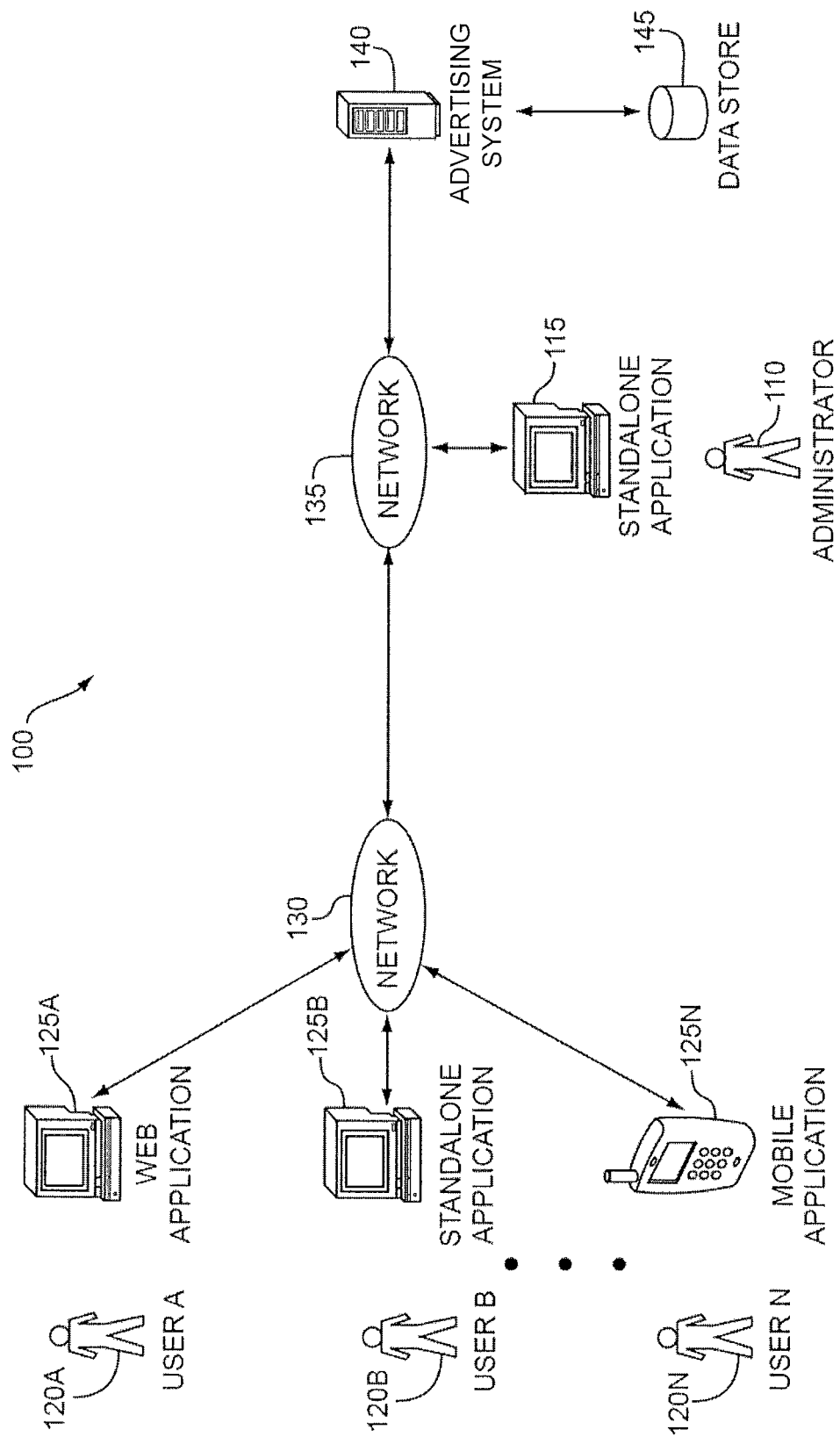
FIG. 1 is a block diagram of a general overview of a network environment and system for distributing advertisement impressions.

FIG. 1 provides a simplified view of a network environment 100 for forecasting advertisement supply and serving advertisements or advertisement impressions in an optimized way. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 100 may include an administrator 110 and one or more users 120A-120N with access to one or more networks 130, 135, and one or more web applications, standalone applications, mobile applications 115, 125A-125N, which may collectively be referred to as client applications. The network environment 100 may also include one or more advertisement systems 140 and related data stores 145. The users 120A-120N may request pages, such as web pages, via the web application, standalone application, mobile application 125A-125N, such as web browsers. The requested page may request an advertisement impression from the advertisement server 140 to fill a space on the page. The advertiser system 140 may serve one or more advertisement impressions to the pages. The advertisement impressions may include online graphical advertisements, such as in a unified marketplace for graphical advertisement impressions. Information about projected supply may be determined with a model that may be created, modified, and/or used by the advertisement system 140. Some or all of the advertisement system 140 and the one or more web applications, standalone application, mobile applications 115, 125A-125N, may be in communication with each other by way of the networks 130 and 135.

The networks 130, 135 may include wide area networks (WAN), such as the Internet, local area networks (LAN), campus area networks, metropolitan area networks, or any other networks that may allow for data communication. The network 130 may include the Internet and may include all or part of network 135; network 135 may include all or part of network 130. The networks 130, 135 may be divided into sub-networks. The sub-networks may allow access to all of the other components connected to the networks 130, 135 in the system 100, or the sub-networks may restrict access between the components connected to the networks 130, 135. The network 135 may be regarded as a public or private network connection and may include, for example, a virtual private network or an encryption or other security mechanism employed over the public Internet, or the like.

The web applications, standalone applications and mobile applications 115, 125A-125N may be connected to the network 130 in any configuration that supports data transfer. This may include a data connection to the network 130 that may be wired or wireless. Any of the web applications, standalone applications and mobile applications 115, 125A-125N may individually be referred to as a client application.

The web application 125A may run on any platform that supports web content, such as a web browser or a computer, a mobile phone, personal digital assistant (PDA), pager, network-enabled television, digital video recorder, such as TIVO®, automobile and/or any appliance or platform capable of data communications.

The standalone application 125B may run on a machine that includes a processor, memory, a display, a user interface and a communication interface. The processor may be operatively connected to the memory, display and the interfaces and may perform tasks at the request of the standalone application 125B or the underlying operating system. The memory may be capable of storing data. The display may be operatively connected to the memory and the processor and may be capable of displaying information to the user B 125B. The user interface may be operatively connected to the memory, the processor, and the display and may be capable of interacting with a user B 120B. The communication interface may be operatively connected to the memory, and the processor, and may be capable of communicating through the networks 130, 135 with the advertisement system 140. The standalone application 125B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 125N may run on any mobile device that may have a data connection. The data connection may be a cellular connection, a wireless data connection, an internet connection, an infra-red connection, a Bluetooth connection, or any other connection capable of transmitting data. For example, the mobile application 125N may be an application running on an APPLE IPHONE®.

The advertising system 140 may include one or more of the following: an ad serving system, an inventory management system, a campaign log, an ad log, and/or a data store. The advertisement system 140 may exist on one machine or may be running in a distributed configuration on one or more machines. The advertisement system 140 may be in communication with the client applications 115, 125A-125N, such as over the networks 130, 135. For example, the advertisement system 140 may provide an interface to the users 120A-120N through the client applications 125A-125N, such as a user interface for inputting search requests and/or viewing web pages. Alternatively or in addition, the advertisement system 140 may provide a user interface to the administrator 110 via the client application 115, such as a user interface for managing the data source 145 and/or configuring advertisements. The users 120A-120N may include advertisers, such as advertiser 205 shown in FIG. 2, and users, such as user 215 shown in FIG. 2.

The advertisement system 140 and client applications 115, 125A-125N may be one or more computing devices of various kinds, such as the computing device described below in conjunction with FIG. 10. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 125A may employ the Hypertext Transfer Protocol ("HTTP") to request information, such as a web page, from a web server, which may be a process executing on the advertisement system 140.

There may be several configurations of database servers, application servers, mobile application servers, and middleware applications included in the advertisement system 140. The data store 145 may be part of the advertisement system 140 and may be a database server, such as MICROSOFT SQL SERVER®, ORACLE®, IBM DB2®, SQLITE®, or any other database software, relational or otherwise. The application server may be APACHE TOMCAT®, MICROSOFT IIS®, ADOBE COLDFUSION®, or any other application server that supports communication protocols.

The networks 130, 135 may be configured to couple one computing device to another computing device to enable communication of data between the devices. The networks 130, 135 may generally be enabled to employ any form of machine-readable media for communicating information from one device to another. Each of networks 130, 135 may include one or more of a wireless network, a wired network, a local area network (LAN), a wide area network (WAN), a direct connection such as through a Universal Serial Bus (USB) port, and the like, and may include the set of interconnected networks that make up the Internet. The networks 130, 135 may include communication methods by which information may travel between computing devices.

Generally, advertisement campaigns ("ad campaigns") may be used to organize an advertiser's advertisements, and may specify and/or designate to whom, when, where, and how an advertisement will be displayed, as well as what advertisement will be displayed. An advertiser may wish to set up or book ad campaigns with one or more advertisement systems, service providers, web publishers, or otherwise, in order to selectively consume available ad opportunities. Ad campaigns may specify matching attributes or values for a subset of attributes of ad opportunities or ad impressions that the ad campaigns target.

In arranging for or requesting information about an ad campaign, advertisers may wish to identify one or more ad campaign requirements or attributes which may be associated with an ad campaign and used to aid in or ensure that advertisements or other listings may be delivered in accordance with the requirements or desires of the advertiser. In addition, advertisers may identify a number of impressions or views which the advertiser may wish to purchase for the advertiser's advertisements. For example, an advertiser may contact an advertising system and request an ad campaign for 1 million views, with the advertiser's advertisement being shown only to males of a first age category.

An inventory management system may assist the advertiser in setting up ad campaigns. An early step for the inventory management system in setting up an ad campaign may be forecasting ad opportunities that satisfy or match the advertiser's ad campaign requirements. Based on the matching and/or relevant ad opportunities that may be available, an amount of available ad opportunities may be determined and a price for the creation of a new advertisement campaign meeting the requirements specified by the advertiser may be computed or otherwise determined. Pricing may be determined by the supply, the demand, and/or the amount of impressions requested by the advertiser.

With information about booked ad campaigns, as well as advertisements themselves, stored in campaign logs, the advertising system 140 may accept requests for advertisements to be delivered, for example, to web pages or in response to search requests. The advertising system may consult booked ad campaigns and select advertisements from ad campaigns whose attributes and/or ad campaign requirements match the characteristics or attributes of the ad opportunity created by the requests.

Figure 2:
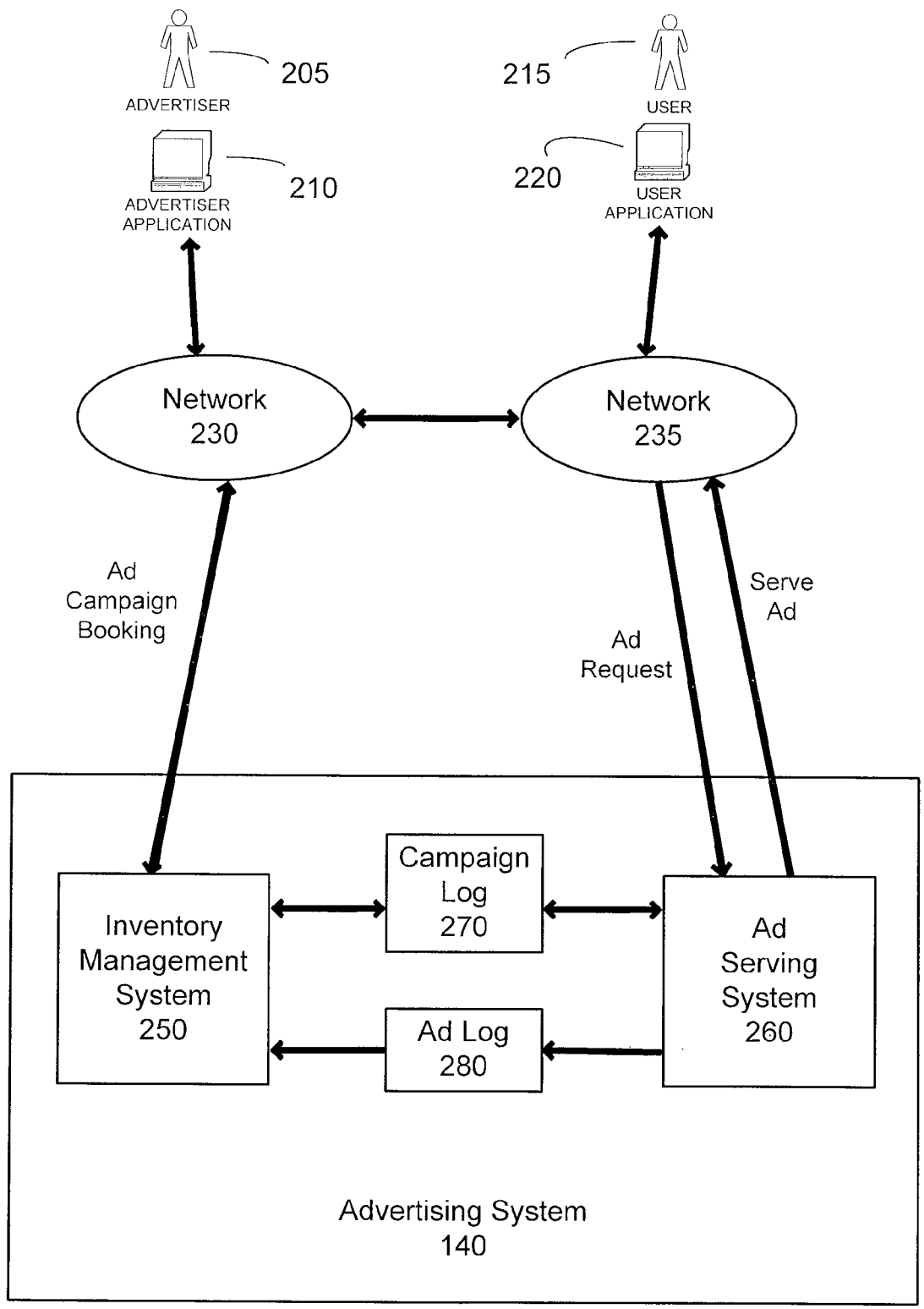
FIG. 2 is a block diagram of an exemplary network environment and architecture for an advertising system.

FIG. 2 is a block diagram of an exemplary network environment with an advertising system 140. The advertising system 140 may include an ad serving system 260, a campaign log 270, an ad log 280, and an inventory management system 250. The advertising system 140 may be connected to one or more networks such as network 230 and network 235. A user 215 may interact with the advertising system 140, and may interact through the use of a user application 220. The user application 220 may be connected to the advertising system 140 through or using the network 235. An advertiser 205 may interact with the advertising system 140, and may interact through the use of an advertiser application 210. The advertiser application 210 may be connected to the advertising system 140 through or using the network 230.

The user 215 may, for example, be any of the users 120A-120N (FIG. 1). The user 215 may be involved in, for example, viewing a web page, searching for information using a search engine, viewing a display, or otherwise gathering information. The user 215 may or may not be aware of the advertising system 140 or any of its components.

The user application 220 may, for example, be a web application 125A, a standalone application 125B, a mobile application 125N, or any other application which may allow the user 215 to view and/or interact with the network 235 and/or the advertising system 140.

The advertiser 205 may, for example, be any of the users 120A-120N. The advertiser 205 may be involved or interested in, for example, disseminating information. The advertiser 205 may wish to advertise the advertiser's businesses, products, or services. The advertiser 205 may, alternatively or additionally, wish to disseminate other information about the advertiser 205 or other information. For example, the advertiser 205 may be an airport or airline and may wish to disseminate information about flights. An advertiser 205 may include any individual, group of individuals, or entity that wishes to disseminate or otherwise distribute information to another individual, group of individuals, or entities.

Advertisements may include any information which an entity wishes to be disseminated to another. For example, advertisements may include information for or about an entity, product, or service. Alternatively or in addition, advertisements may include any other information, messages, data, or otherwise that an entity wishes to convey. Advertisers may be any individual, group of individuals, or entity which wishes to convey or disseminate any information, message, data, or otherwise to another.

The advertiser application 210 may, for example, be a web application 125A, a standalone application 125B, a mobile application 125N, or any other application which may allow the advertiser 205 to view and/or interact with the network 230 and/or the advertising system 140.

Network 230 may, for example, be a network like network 130 or network 135. Network 230 may be connected or otherwise in communication with the user 215, the user application 220, the advertising system 140, and/or any of the components of the advertising system 140.

Network 235 may, for example, be a network like network 130 or network 135. Network 235 may be connected or otherwise in communication with the advertiser 205, the advertiser application 210, the advertising system 140, and/or any of the components of the advertising system 140.

For illustrative purposes, networks 230 and 235 are shown as separate networks, but networks 230 and 235 may be one network. Networks 230 and 235 may be identical or different. Networks 230 and 235 may include a plurality of networks which may all be the same or different. Networks 130, 135, 230, 235, and 1026 may include different networks connected together or all part of the same network, or any combination thereof.

In general, the advertising system 140 may manage, assist in, and/or control the display of advertisements and/or other information to a user 215 when the user 215 seeks information, such as, for example, by visiting a web page or entering a query using a search engine. As mentioned, the advertising system 140 may include an inventory management system 250, an ad serving system 260, a campaign log 270, and an ad log 280.

As previously mentioned, the advertiser 205 may wish to create an ad campaign to monitor and manage a delivery of advertisements or other information related to the advertiser 205 to users such as user 215. The advertising system 140 may, for example, provide an interface through which the advertiser 205 may communicate with the advertising system 140. The advertiser 205 may query, request, or otherwise inquire about information regarding setting up or booking an ad campaign with the advertising system 140.

The advertiser 205 may wish to target advertisements or information to a particular type of user, during a particular time period, and/or in a particular manner. The purpose of the ad campaign which the advertiser 205 may seek to set up may be to organize and/or simplify the efforts of the advertiser 205 and to allow the advertiser 205 to target advertisements and information as desired.

In order to set up and/or book an ad campaign, however, an advertising system 140 may wish to determine or ensure that it has a sufficient supply of advertising opportunities which may be available to the advertiser 205, should the advertiser 205 set up an advertising campaign. The advertising system 140 may wish to gather, from the advertiser 205, one or more characteristics and/or attributes that the advertiser 205 may desire or require of ad opportunities that the advertiser 205 is interested in acquiring for display of the advertiser's advertisements. For example, the advertiser 205 may wish to serve its advertisements only to males of a first age category in the state of California. Alternatively, the advertiser may wish to serve its advertisements to females under the age of 16 or over the age of 50 in any one of one thousand zipcodes.

Accordingly, in inquiring or requesting information on booking an ad campaign, the advertising system 140 may allow the advertiser 205 to specify one or more of these or other attributes or ad campaign requirements ("attributes"). As mentioned, attributes may identify one or more requirements or characteristics of ad opportunities required or desired by the advertiser. In some embodiments, each attribute is related to only one attribute type (sometimes "attribute topic"). In other embodiments, each attribute may be related to one or more attribute types or attribute topics. Attributes may, for example, identify a particular subset of the population which the advertiser may wish to display advertisements or information to, a position or placement of an advertisement, a timing of an advertisement, qualifications or pre-requisites necessary for the display of an advertisement, or any other type of information pertaining to a potential viewer of an advertisement, or placement, location, type, or timing of an advertisement.

Attribute types may include, for example, a position of the advertisement, a content topic of the page or display, a gender of the potential viewer, an age or age category of the potential viewer, a location of the advertisement, a location of the potential viewer, and/or a behavior tag. Attribute types may also or alternatively include, for example, a device identifier (such as a user or device specific identification number or name) or device type (such as an iPad, mobile phone, laptop, etc.) on which a user is viewing content. Attribute types may also or alternatively include, for example, a time of day, day of the week, and/or other timing information for the ad impression. Attribute types may specify or clarify one or more of characteristics of an ad opportunity or display, such as who may view an advertisement and what is the viewer interested in or is the content of the opportunity and/or type of advertisement to fill it. In addition, attributes may specify or clarify when, where, and how an advertisement may be displayed to fill the ad opportunity. Any number of attribute types may exist.

As an example, consider the attribute type-attribute pair of "Content Topic={Sports, Finance}." Here, the attribute type refers to "Content Topic," and the attributes are "Sports" and "Finance." As another example, consider "Zipcode={112345, 23456, 34567}," where "Zipcode" is the attribute type, and "12345," "23456," and "34567" are the attributes associated with the attribute type "Zipcode."

The advertiser 205 may input an attribute for one or more attribute type. For example, the advertiser 205 may input "Sports" for an attribute type "Content Topic."

The advertiser 205 may input one or more than one attribute for each attribute type. For example, the advertiser 205 may list one thousand different zipcodes for the attribute type "Zipcode." In some systems, any number of attributes may be input for an attribute type.

The advertiser 205 may choose not to enter an attribute for one or more of the attribute types. The advertiser 205 may, in some embodiments, only enter an attribute for those attribute types which the advertiser 205 has a particular interest in identifying, and may not enter attributes for attribute types which the advertiser 205 does not have any preferences for.

The advertiser 205 may input the attributes using a menu or listing provided by the advertising system 140. For example, the advertising system 140 may provide a drop down menu for each attribute which, when interacted with by the advertiser 205, displays a list of possible attributes selectable by the advertiser for that attribute type. Alternatively, the advertising system may provide a text box for each attribute type, into which the advertiser may enter the attribute. In addition or alternatively, the advertising system 140 may automatically gather one or more attributes from the advertiser, such as, for example, by using information previously gathered by the advertiser or using cookies or other data collected or collectable from the advertiser. Any other method of inputting or gathering an attribute is possible.

Attributes may be identified in the negative. For example, an advertiser 205 may input or otherwise indicate "NOT Sports" into the attribute type "Content Topic." In this manner, the advertiser 205 may specify that it does not wish for its ad campaign to be associated with ad opportunities with a content topic of "Sports." Where a drop down menu or other listing is provided by the advertising system 140, the menu or listing may include a tab, button, clickable indicator, or other manner of indicating that the input is a negative input.

Attributes may be gathered, input, or otherwise supplied to the advertising system 140 at any point. For example, the advertiser 205 may input one or more attributes when the advertiser 205 initially interacts with the advertising system 140, or at any other point. In some embodiments, the advertising system 140 may prompt the advertiser for one or more attributes, such as after the advertiser 205 has initially interacted with the advertising system 140. The advertising system 140 may alternatively, or in addition, gather one or more attributes from the advertiser 205 automatically upon the advertiser's initial interaction with the advertising system 140.

As shown in FIG. 2, the request or inquiry for ad campaign booking information from the advertiser 205 may be directed to the inventory management system 250 of the advertising system 140. As mentioned, this inquiry or request may be accompanied by one or more attributes or ad campaign requirements for the advertiser. The request or inquiry and/or attributes may be directly sent to the inventory management system 250 by the advertiser 205, or may be directed or sent by the advertiser 205 to the advertising system 140, and then directed to the inventory management system 250 by the advertising system 140.

Figure 3:
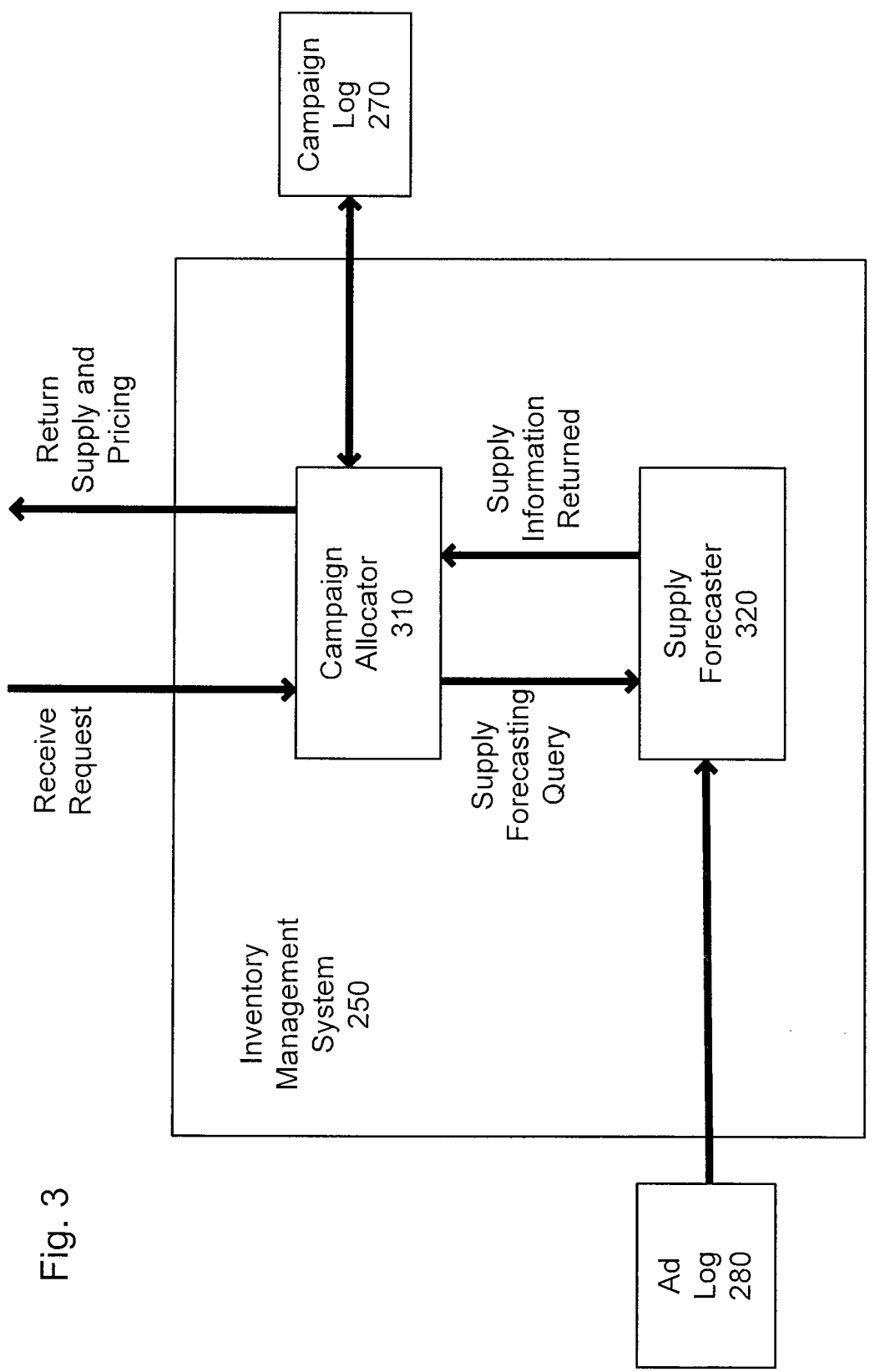
FIG. 3 is a block diagram of an exemplary architecture for an inventory management system.

Turning now to FIG. 3, it shows the inventory management system 250, which may include a campaign allocator 310 and a supply forecaster 320. In some embodiments, the campaign allocator 310 and the supply forecaster 320 may be the same component, and in other embodiments, they may be separate. The inventory management system 250 may be connected to or otherwise in communication with the campaign log 270.

For example, as shown in FIG. 3, the campaign log 270 may be in communication with the campaign allocator 310 of the inventory management system 250. The inventory management system 250 may also be connected to or otherwise in communication with the ad log 280. For example, as shown in FIG. 3, the ad log 280 may be in communication with the supply forecaster 320. Any other configurations or connections between the inventory management system 250, the campaign log 270, and the ad log 280 may be possible.

The inventory management system 250 may be designed, operable, constructed, or otherwise configured to assist in the creation and/or booking of an ad campaign. The inventory management system 250 may be responsible for both forecasting a supply, such as determining a number of possible advertisement opportunities, and also for allocating the supply to the demand.

As shown in FIG. 3, the inventory management system 250 may receive the request or inquiry, along with any possible attributes or ad campaign requirements, from an advertiser 205. The request may, for example, be for information about booking an advertisement campaign, supply information, an offer or other details about booking an ad campaign, and/or any other information related to ad campaigns.

When an inquiry or request is received by the inventory management system 250, the inquiry or request may be directed to the campaign allocator 310. The campaign allocator 310 may assist in, be responsible for, or otherwise participate in determining an allocation of possible supply with known or projected demands. The campaign allocator 310 may seek supply information which the campaign allocator 310 may then use in allocating the supply with the demand. The campaign allocator 310 may request supply data and/or information from the supply forecaster 320. The supply data and/or information requested by the campaign allocator 310 may include a request for a predicted amount of ad opportunities which match or are relevant to the attributes and/or ad campaign requirements specified by the advertiser 205. The campaign allocator 310 may include the attributes in the request.

Figure 4:
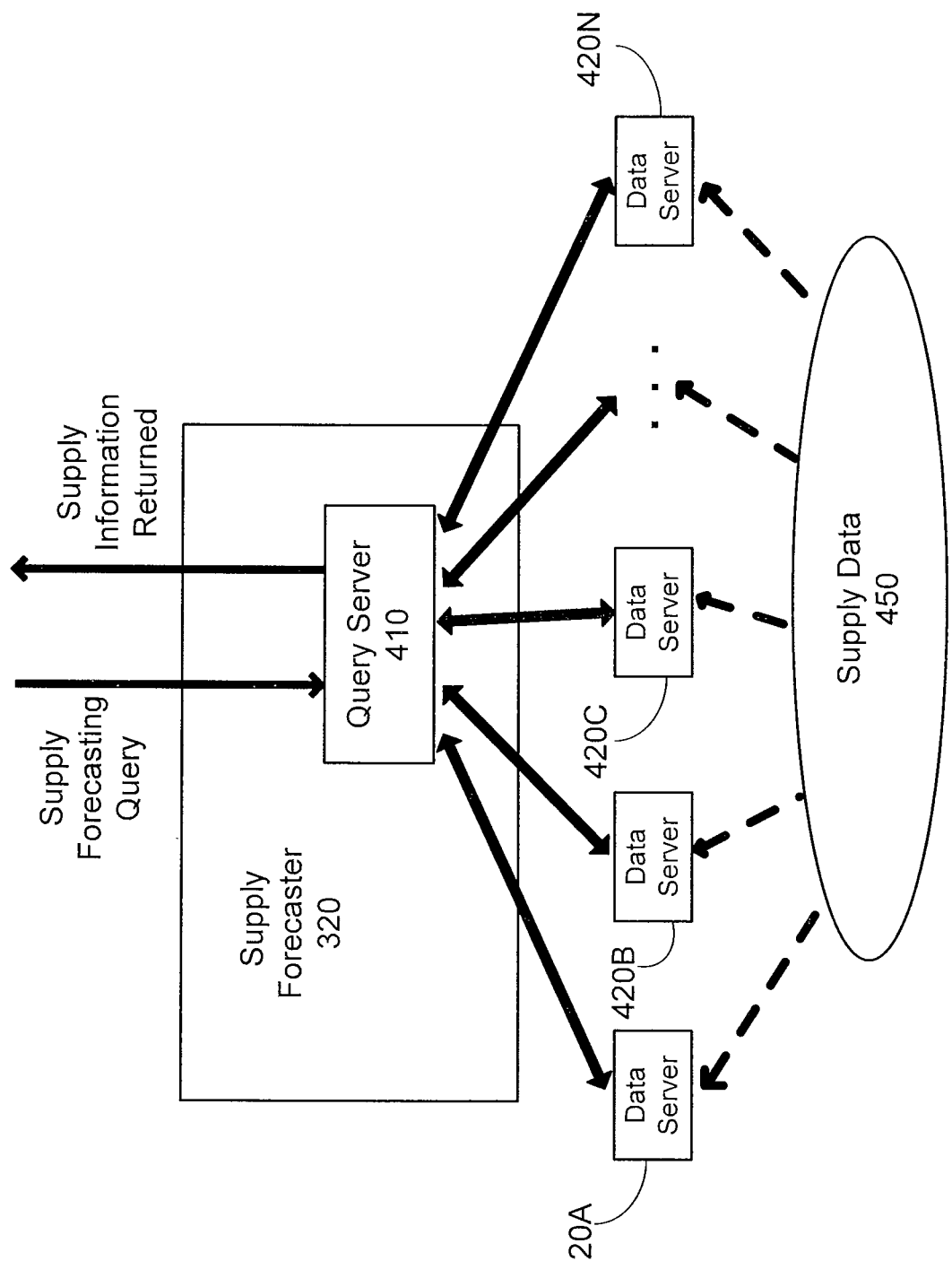
FIG. 4 is a block diagram of an exemplary architecture for an advertising system.

As shown in FIG. 4, the supply forecaster 320 may include, for example, a query server 410. The supply forecaster 320 may receive the request for supply data and/or information from the campaign allocator 310, as well as the attributes specified by the advertiser 205. The request for supply data and/or information may be, for example, a request for general information about an available supply. The request for supply data and/or information may, alternatively or in addition, include a request for matching samples and/or weight for the supply. The request for supply data and/or information may be, alternatively or in addition, a request for a forecasted supply based on historical counts of ad impressions and/or trends. Other information or requests are possible.

The request or inquiry from the campaign allocator 310 may be, for example, directly sent to the query server 410, or may be generally sent to the supply forecaster 320 and then directed by the supply forecaster 320 to the query server 410. In other embodiments, the initial request or query from the advertiser 205 for ad campaign information may be directly sent to the supply forecaster 320 or query server 410.

As mentioned, supply forecaster 320 may be asked to determine a supply of advertising opportunities that may be assigned or otherwise reserved by the advertiser 205. For example, the supply forecaster 320 may be tasked with determining a supply of advertising opportunities which match the attributes or ad campaign requirements presented by the advertiser 205. As mentioned, due to the nature of online advertising, the advertiser 205 may not have a hard and fast, or otherwise permanent, set of advertising opportunities which are known and certain to take place in the future. Rather, the supply forecaster 320 may look to data about previous advertising impressions in order to forecast, estimate, and/or predict the number of similar advertising opportunities likely to occur in the future.

For example, if an advertiser 205 inputs attributes or ad campaign requirements such as "Content Type=mortgages; Dates=06/01/2011-06/15/2011; Gender=Male" and made a booking request on, for example, Jul. 1, 2010, it may not be possible for the supply forecaster 320 to know precisely how many advertising opportunities will arise between the dates specified related to mortgages and males. However, the supply forecaster 320 may be able to predict how many advertising opportunities may exist during that period by using a supply forecasting model (sometimes referred to as "forecast model," "forecasting model," or "forecasting system") and, for example, determining how many ad impressions occurred during a similar time period or under similar circumstances. For example, the supply forecaster 320 may look to see how many ad impressions related to mortgages and males occurred during 06/01/2010-06/15/2010. In addition, or alternatively, the supply forecaster 320 may take into account more recent trends in ad impressions, such as how many ad impressions related to mortgages and males have occurred in the last 15 or 30 days. In some embodiments, the supply forecaster 320 may, alternatively or in addition, look at ad impressions for related websites. For example, the forecast trend for content topic=mortgages may be similar to the forecast trend for content topic=finance, and as such, the supply forecaster 320 may look at ad impressions dealing with mortgages and/or finance for forecasting supply for either mortgages or finance. This may be useful, for example, in cases where a particular target may have a small number of impressions. There, forecasting models may use the trend of a coarser granularity pool of impressions to get a large enough pool that exhibits predictable trends. The supply forecaster 320 may look to any number of time periods and/or similar occurrences to gather data which may be useful with a supply forecasting model for determining, predicting, forecasting, and/or estimating a supply in accordance with requested attributes or ad campaign requirements.

FIG. 4 illustrates a plurality of data servers 420A-420N. Large amounts of data and information about past advertisement impressions, collectively referred to as supply data 450, may be stored in or otherwise accessible to or from the data servers 420A-420N. In some systems, the supply data 450 may, for example, be stored in ad logs, such as ad log 280, or may be stored elsewhere.

Given that a system may encounter, for example, tens of billions or more ad opportunities or impressions a day, the supply data 450 may be on the order of trillions or more of ad impressions and opportunities. Accordingly, this data may be partitioned across a set of multiple data servers 420A-420N. The data servers 420A-420N may store and/or access data about all previous advertisement impressions or opportunities from a previous given time frame, such as over the last five years.

The supply data 450 may include attribute information about each ad impression. The supply data 450 may include attributes for some or all of the attribute types for each ad impression. For example, the supply data 450 may include a record of some or all ad impressions made on any particular system, and/or over any particular time period, and may further include attribute information about the characteristics of the viewer of the advertisement impression, as well as the timing, placement, surrounding content, or other information about the ad impression.

These ad impressions and attributes and/or characteristics about ad impressions may be gathered by the ad serving system 260 from any user who views the ad impression. For example, this information may be collected from using cookie information, user log-in information, or an analysis of IP information. Alternatively or additionally, some or all of the information may be volunteered by the user. In some embodiments, anytime the ad serving system 260 serves an ad, ad impression information is recorded and added to the supply data 450.

The wealth of information stored in the data servers 420A-420N, the supply data 450, the ad log 280, and/or opportunity sample index 520 may be used by the supply forecaster 320 to aid in determining a predicted supply of ad opportunities which may be available in the future.

In reviewing and gathering data on past ad impressions, it may be the goal of the supply forecaster 320 to determine when a past ad impression matches attributes or ad campaign requirements of the advertiser 205. An ad impression may match or qualify as relevant for a campaign when the attribute of its attribute type satisfies the conditions specified by the campaign. In some embodiments, an ad impression may match or be relevant if all of the attributes specified by the advertiser 205 are the same with the ad impression.

As an example, consider where three campaigns have been requested or booked:
Campaign 1 specifies: Content Topic=Sports; Location=CA.
Campaign 2 specifies: Content Topic=Finance; Age Category=2.
Campaign 3 specifies: Content Topic=Sports; Gender=Male.

An ad impression may have the following attributes: Content Topic=Sports; Gender=Male; Age Category=2; Location=CA; Behavior Tag=Politics. In this example, the ad impression matches Campaigns 1 and 3, but does not match Campaign 2. More or less attribute topics may be included in the ad impression.

In gathering information from the data servers 420A-420N about past ad impressions, the query server 410 of the supply forecaster 320 may, upon receiving a request for supply data, supply information, and/or a supply forecast, request data or information from each of the data servers 420A-420N, as shown in FIG. 4. The request for data or information from each of the data servers 420A-420N may be, for example, a matching samples query, supply forecasting request, or may be an alternative query. This request or query from the query server 410 may be sent to the data server 420A-420N in parallel. This may be done in a load-balancing manner by scattering the requests to all data servers 420A-420N in order to maximize an amount of data to be received, while minimizing time and effort in procuring the information.

In requesting the data or information from each of the data servers 420A-420N, the query server 410 may include the attributes specified by the advertiser 205. In some embodiments, the data servers 420A-420N may be queried only for advertisement impressions or opportunities that match or are related to the attributes specified by the advertiser 205.

The query server 410 may send a request to the data server 420A for a total number, or estimation, of advertisement impressions or opportunities that match or are related to the attributes specified by the advertiser 205. The query server 410 may additionally or alternatively request one or more matching samples of advertising impressions or opportunities that match or are related to the attributes specified by the advertiser 205. The query server 410 may additionally or alternatively request a weight for each of the matching samples. The weight for each matching sample may represent a number of impressions in the data server which the matching sample is meant to represent.

In some embodiments, the query server 410 may request a designated and/or predetermined number of weighted matching supply samples. In these embodiments, each query result may be represented as a set of matching supply samples, where each matching sample has a weight associated with the amount of supply (ad opportunities) it represents. The query server 410 may expect and/or receive a designated and/or predetermined number of samples to be returned from each data server. The total supply for a query may be the sum of the weights of the matching samples in the query result.

Each data server 420A-420N may receive the query from the query sever 410, and may consult, review, search, and/or query the supply data 450 available to the data server 420A-420N.

As mentioned, in some systems, each data server 420A-420N may store a portion of the supply data 450, such that all of the supply data 450 is stored in at least one of the data servers 420A-420N. In a system such as this, the data servers 420A-420N may each search the supply data 450 stored with the data server and return any matching samples which may match and/or relate to the query.

The returned information may include, for example, an estimated and/or calculated total number of advertisement impressions or opportunities matching the attributes received from the query server 410. The information may include, for example, a set of sample advertisement impressions or opportunities matching the attributes received from the query server 410. As mentioned, in some embodiments, each query result may be represented as a set of supply samples, where each sample has a weight associated with the amount of supply it represents, and where the total supply for a query is the sum of the weights of the samples in the query result.

Each matching sample may include one or more attributes about the ad impression or ad opportunity. In some embodiments, all known attributes about the ad impression or opportunity sample may be included. Where the query server requests advertisement impression information that matches the attributes specified by an advertiser 205, each of the sample advertisement impressions or opportunities may have at least those attributes specified by the advertiser 205.

As mentioned, each sample may also include a sample weight. The sample weight may indicate the number of ad impressions or opportunities like the sample that the data server 420A-420N has. The total number of available ad impressions or opportunities may be calculated by taking the sum of the weighted samples.

As noted, in some embodiments, the query server 410 may specify that one sample be returned for every X number of matching/relevant ad opportunities. In these embodiments, the total number of available ad impressions or opportunities may also be calculated by taking the sum of the number of samples multiplied by the weight.

In some embodiments, it may be assumed that each of the data servers 420A-420N has a generally even distribution of advertisement impressions, opportunities, or opportunity samples stored and/or indexed in the opportunity sample index 520. In some of these embodiments, the sample weight may be uniform for each sample returned from one of the data servers, as the system may assume that each of the samples is equally likely to represent 1/(number of samples) of the total number of advertisement impressions or opportunities.

For example, data server 420C may receive the query from the query server 410. The data server 420C may have 100 advertisement impressions or opportunities matching the attributes specified by the advertiser. The data server 420C may return 10 samples from the 100 advertisement impressions. In some embodiments, it may be assumed that the 10 samples each represent 1/10 of the advertisement impressions available, and therefore, each advertisement sample may be weighted by 10. The total advertisement impressions available from data server 420C may be calculated by summing the weighted samples. In this example, the sum of the weighted samples is 10+10+10 . . . +10=10 (10)=100.

If, in the above example, 20 samples are returned instead of 10, each of the samples may be weighted by 5. As such, the total advertisement impressions, which may be the sum of the weighted samples, is 5+5+5+5=20(5)=100.

As another example, consider where a query server 410 requests supply information for ad impressions with: Content Topic=Sports; Location=CA.

Assume the query server 410 requests three weighted samples indicating the number of ad opportunities. Assume the data server has six ad impressions corresponding to this query:

I1: Content Topic=Sports; Location=CA; Gender=Male; Age Category=2; Behavior Tag=Politics . . .

I2: Content Topic=Sports; Location=CA; Gender=Female; Age Category=2; Behavior Tag=News . . .

I3: Content Topic=Sports; Location=CA; Gender=Male; Age Category=3; Behavior Tag=Politics . . .

I4: Content Topic=Sports; Location=CA; Gender=Female; Age Category=2; Behavior Tag=News . . .

I5: Content Topic=Sports; Location=CA; Gender=Male; Age Category=4; Behavior Tag=News . . .

I6: Content Topic=Sports; Location=CA; Gender=Female; Age Category=3; Behavior Tag=Politics . . .

The data server may then return only three samples, chosen at random from the set of ad impressions, with each sample being weighted two.

S1: Weight=2; Content Topic=Sports; Location=CA; Gender=Male; Age Category=2; Behavior Tag=Politics . . .

S2: Weight=2; Content Topic=Sports; Location=CA; Gender=Male; Age Category=3; Behavior Tag=Politics . . .

S3: Weight=2; Content Topic=Sports; Location=CA; Gender=Female; Age Category=2; Behavior Tag=News . . .

Samples may be randomly chosen. Samples may be manually or automatically chosen based on one or more characteristics, or may be chosen in any other way or combination of ways. For example, an algorithm or algorithmic component may be used that picks up the most relevant sample that represents the supply data and/or ad impressions in the data server.

Figure 5:
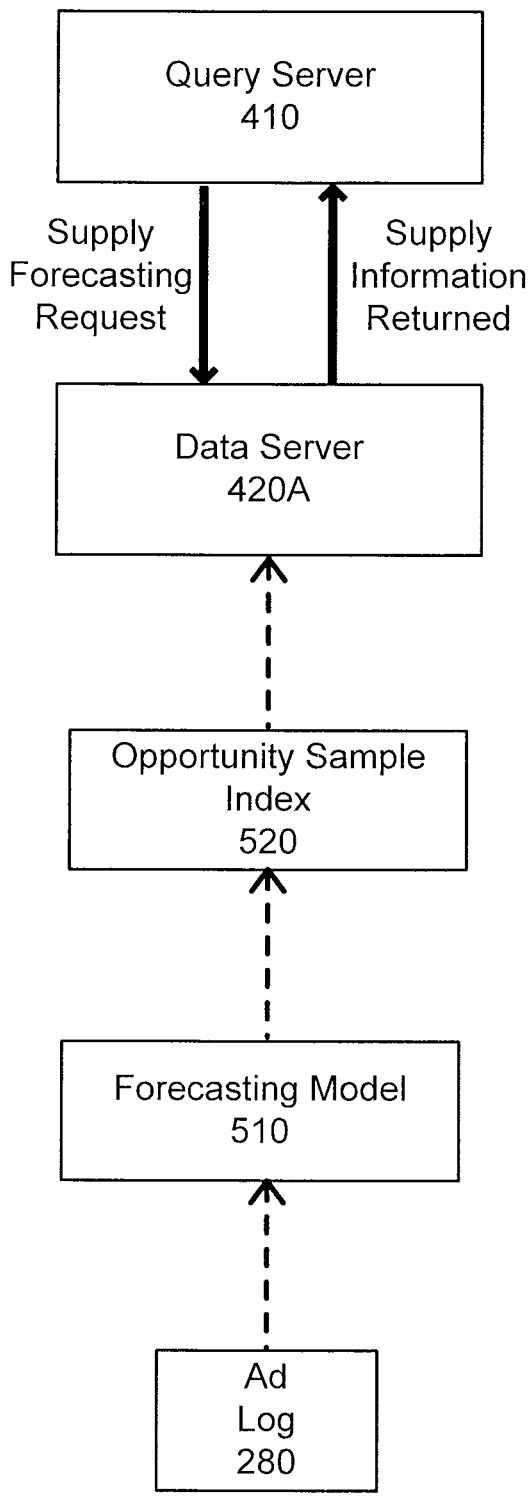
FIG. 5 is a block diagram of an exemplary architecture for a portion of an advertising system.

FIG. 5 illustrates an alternative system where a data server 420A processing a supply forecasting request from a query server 410 consults only an opportunity sample index 520 and/or a forecasting model 510, rather than an entire partition of supply data 450. A similar system and method may be carried out with each of the data serves 420B-N.

Because a system may encounter, for example, 20 billion or more ad opportunities or impressions a day, the supply data 450 may be on the order of trillions or more of ad impressions and opportunities, and the system may need to not only partition the supply data across multiple data servers 420A-420N, but also may need to further reduce the number of samples by using an opportunity sample index 520 of only a portion of the supply data 450 partitioned to each data server 420A-420N.

As mentioned, in some of these systems, only a portion of the supply data 450 may be indexed, stored and/or accessed by the data servers 420A-420N, such as with the opportunity sample index 520. This may be done to alleviate possible storage concerns and/or to allow for more efficient sorting or searching of the information or data. Accordingly, in some of these embodiments, the data servers 420A-420N may store and/or access only the opportunity sample index 520, which may index only a portion of samples of supply data 450.

The opportunity sample index 520 may be created in a number of ways. As mentioned, one or more ad logs, such as ad log 280, may contain information, such as supply data 450, about a portion or all possible ad opportunities. In other embodiments, the supply data 450 may not be stored in or accessible to ad logs 280, but rather may be stored and/or accessed elsewhere.

The supply data 450 and/or ad logs 280 may include large amounts of data. Accordingly, it may not be possible for the set of data servers 420A-420N to search through all of the advertising opportunities. In some systems, as shown in FIG. 5, a forecasting model 510 may be used and/or consulted during the creation of the opportunity sample index 520.

The forecasting model 510 may be used in conjunction with the opportunity sample index 520 to, for example, determine which information to be included in an opportunity sample index 520, and/or determine index samples or sample values from the supply data 450. The forecasting model 510 may index a number of advertising opportunities which may be a subset of the whole set of advertising opportunities for each data server. For example, a forecasting model 510 may select a set of samples or sample values from the ad log 280 to be included in the opportunity sample index 520, and/or may transfer any selected values and/or samples to the opportunity sample index 520 for indexing. A selection by a forecasting model 510 may be random or criteria based, and/or may be automatic or manual. For example, the forecasting model 510 may select for indexing one advertising opportunity out of every one thousand advertising opportunities. The selection may be based on an algorithm, trends, and/or a set of samples gathered based on one or both. This set of selected opportunity may then be indexed in this opportunity sample index 520.

Each data server 420A-420N may have and/or utilize a separate forecasting model 510, or may have and/or utilize the same forecasting model 510. Various combinations are possible.

The opportunity sample index 520 may be a bit vector index or other index. Where the index 520 is a bit vector index, when a campaign query arrives, the system may gather all the matching bit vectors and further process them (computing the Boolean AND, OR, and NOT operations as needed) to arrive at the set of opportunities that match.

In some embodiments, all of the supply data 450 is first partitioned so that a subset of the supply data 450 is assigned to each of the data servers 420A-420N, after which an opportunity sample index 520 is created for each data server 420A-420N from the assigned subset of supply data 450 for each data server. Accordingly, in this embodiment, each data server has a separate opportunity sample index 520. Alternatively, using all of the supply data 450, one opportunity sample index 520 may be created, after which a portion of the opportunity sample index 520 may be assigned to each of the data servers 420A-420N. Other ways of creating an opportunity sample index 520 may be possible.

Each factor and/or set of data from the ad logs 280 and/or supply data 450 may be considered and/or input into a supply forecasting model 510 in or associated with, for example, the supply forecaster 320, to generate an expected supply of ad opportunities. Alternatively, the supply forecasting model 510 may exist separately from the supply forecaster 320.

Historical counts and trends may be used by the supply forecaster 320 and/or forecasting model 510 to forecast future counts and trends for supply. In this way, the supply forecaster 320 and/or forecasting model 510 may be able to review past ad impressions and determine, forecast, predict, and/or estimate a future supply. Other methods of indexing and/or using the forecasting model 510 are possible.

Indexes, like the opportunity sample index 520, may be used by a display advertising system and/or data server, such as data server 420A, to load and/or probe opportunities when a campaign query is being processed. In this way, the use of the opportunity sample index 520, as opposed to the entire set of advertising opportunities, may further allow a data server 420A to search and/or consult a smaller set of data in a faster and more efficient way, while only sacrificing a minimal amount of precision.

In the system as shown in FIG. 5, a data server 420A may access, store, and/or consult an opportunity sample index 520 for the requested supply information in a manner similar to or the same as the access, storage, and consultation of the supply data 450 described above. Namely, a data server 420A may search the data in the opportunity sample index 520 and determine what stored or indexed values and/or samples match the query. The matched data is then compiled, with weighted values accounted for, and the resulting supply information is sent to the query server 410.

As an example of the system and method shown in FIG. 5, consider a situation where an ad log, such as ad log 280 of FIG. 5, has the following ad opportunities:

I1: Content Topic=Sports; Zipcode=12345; Gender=Male; Age Category=2; Behavior Tag=Politics . . .

I2: Content Topic=News; Zipcode=23456; Gender=Female; Age Category=2; Behavior Tag=Finance . . .

I3: Content Topic=News; Zipcode=12345; Gender=Male; Age Category=3; Behavior Tag=Politics . . .

I4: Content Topic=Sports; Zipcode=12345; Gender=Female; Age Category=2; Behavior Tag=Politics . . .

I5: Content Topic=Sports; Zipcode=12345; Gender=Female; Age Category=4; Behavior Tag=Finance . . .

I6: Content Topic=News; Zipcode=12345; Gender=Female; Age Category=3; Behavior Tag=Politics . . .

I7: Content Topic=Sports; Zipcode=23456; Gender=Male; Age Category=4; Behavior Tag=Finance . . .

I8: Content Topic=News; Zipcode=23456; Gender=Female; Age Category=3; Behavior Tag=Politics . . .

In this example, there are eight total ad opportunities. The supply forecasting model 510 may gather, sample, collect, assimilate, and/or otherwise select a specified number of the ad opportunities as opportunity samples 520. For example, the supply forecasting model 510 may select and/or index the following advertisement opportunities in the opportunity sample index 520:

I1: Content Topic=Sports; Zipcode=12345; Gender=Male; Age Category=2; Behavior Tag=Politics . . .

I3: Content Topic=News; Zipcode=12345; Gender=Male; Age Category=3; Behavior Tag=Politics . . .

I5: Content Topic=Sports; Zipcode=12345; Gender=Female; Age Category=4; Behavior Tag=Finance . . .

I7: Content Topic=Sports; Zipcode=23456; Gender=Male; Age Category=4; Behavior Tag=Finance . . .

The selected advertisement opportunities may be indexed in an opportunity sample index 520, which may or may not be stored in and/or accessed by the data server 420A. Each of the indexed advertisement opportunities in the opportunity sample index 520 may have a weight. The weight may be equivalent to the ratio of the number of advertising opportunity (in this example, 8) over the number of opportunity samples (in this example, 4). Here, the weight may be 2. Other methods of providing weights for the samples are possible, including those described herein.

When the data server 420A queries the indexed advertisement opportunities in the opportunity sample index 520 and/or the forecasting model 510, the data server 420A may specify the type of information, data, and/or samples which the data server 420A would like further information, data, and/or samples for. For example, the data server 420A may query the forecasting model 510 and/or the opportunity sample index 520 seeking supply information for a query specifying "Content Topic=Sports; Zipcode=12345." In this example, the forecasting model 510 and/or the opportunity sample index 520 may be searched and/or return:

I1: Content Topic=Sports; Zipcode=12345; Gender=Male; Age Category=2; Behavior Tag=Politics . . .

I5: Content Topic=Sports; Zipcode=12345; Gender=Female; Age Category=4; Behavior Tag=Finance . . .

In this example, only those indexed advertisement opportunities in the opportunity sample index 520 and/or data and information from the forecasting model 510 were be searched. Accordingly, I1 and I5 were returned, as these indexed advertisement opportunities match the query, while I3 and I7 were not returned since they do not match the query. In addition, because each of I1 and I5 were weighted 2, the total number of forecasted advertising opportunities may be estimated and/or calculated to be 4. This may be an approximation, as a review of the entire ad opportunity list may, for example, show that only 3 matching opportunities exist. However, the approximation of the system of FIG. 5 may be conducted much faster and using fewer resources than a query conducted over an entire set of ad opportunities, and may produce an approximation which is within an allowable tolerance. Other methods of searching the supply data 450 are possible.

As mentioned, the gathered data regarding past impressions may be used by supply forecasting models for forecasting a supply of potential ad opportunities. As mentioned, forecasting models such as forecasting model 510 may be, for example, created from or using ad logs like ad log 280 to model future supply in or for a supply forecasting engine, such as the supply forecaster 320. The ad log 280 may be in a feedback loop to understand ad opportunities which may be available. The ad log 280 may be and/or may store a listing of ad events in terms of ad impressions. For each impression, the attributes of the impression may be listed. In some embodiments, the ad impressions may be weighted, in that if the same impression or type of impression occurs multiple times, it may be represented in the ad log by one entry with a corresponding weight. The data in the ad log 280 may be analyzed for forecasting count and trends and the development of forecasting models.

The forecasting model, such as forecasting model 510, created and/or modified by the ad log 280 may be stored in the ad log 280, the query server 410, and/or one or more of the data servers 420A-420N. In some embodiments, the forecasting model 510 may be created and updated by the ad log 280. The forecasting model 510 may be updated, for example, daily or at any given time period. The forecasting model 510 may be updated with information received by and/or stored in the ad log 280.

A part or all of the forecasting model or models may, for example, be sent, uploaded, downloaded, and/or otherwise communicated by the ad log 280 to one or more of the data servers 420A-420N. For example, each data server 420A-420N may receive and/or communicate with an updated forecasting model 510 with an updated set of data from ad impressions logged during the previous period. This may, for example, occur daily. In some embodiments, the data servers 420A-420N may each forecast a supply by receiving the query from the query server 410 and use the forecasting model 510 to determine a projected supply of data. The query server 410 may receive from each data server 420A-420N an actual forecasted supply (such as the matching samples in FIG. 5), and may determine a total forecasted supply by merely aggregating the received forecasted supply from each data server 420A-420N. In these embodiments, the query server 410 may not need to and/or may not actually receive raw data from the data servers 420A-420N, but may merely receive a forecasted supply from each data server 420A-420N. In some embodiments, the forecasting may be done locally in each data server 420A-420N. These systems may, for example, be useful where large amounts of raw data may be stored in each of the data servers 420A-420N.

The creation, updating, adjustment, and/or communication of forecasting models such as forecasting model 510 may be done partially or completely offline and/or partially or completely online.

As shown in FIG. 3, once the data has been input into the supply forecasting model and a forecasted or otherwise determined supply estimate is obtained by the supply forecaster 320, the supply forecaster 320 may return the supply information to the campaign allocator 310. In other embodiments, raw data may be sent to the campaign allocator which may conduct the supply forecasting.

Where supply data is received by the campaign allocator 310, the campaign allocator 310 may proceed to determine how much of the supply may be allocated, if booked or reserved, to an ad campaign requested by the advertiser 205. This determination may require consulting or otherwise communicating with the campaign log 270 to gather, consider, and/or analyze information pertaining to other campaigns or advertisements already booked with the advertising system 140 and recorded in the campaign log 270.

The campaign log 270 may contain or store some or all information regarding any campaigns which have been booked or reserved with the advertising system 140. The campaign log 270 may additionally or alternatively contain or store some or all of the advertisements or other information to be displayed which relate to the booked or reserved ad campaigns or the advertisers who have booked or reserved the ad campaigns. The campaign log 270 may determine one or more allocation parameters for each advertising campaign. The allocation parameters may suggest how the campaign will consume ad impressions that match its requirements. For example, some ad campaigns may be created that consume every impression that the ad campaign qualified for. These may be called exclusive campaigns. Other campaigns may take a percentage of impressions they qualify for. This determination may be made based on parameters of the campaign when booked, such as by specifying if the campaign is an exclusive campaign and/or the relative proportion of the demand specified by the ad campaign to the size of its eligible supply.

The campaign allocator 310 may compare the identified supply received from the supply forecaster 320 with ad campaigns requesting or associated with part or all of the identified supply, and may determine what portion of the identified supply is actually available for a requested campaign. For example, the campaign allocator 310 may receive an indication from the supply forecaster 320 that there are 100 advertising opportunities available for a requested advertising campaign with the attributes specified by the advertiser 205. The campaign allocator 310 may determine what portion of those advertising opportunities are already accounted for by other campaigns already booked or reserved (such as campaigns stored in the campaign log 270 which specify, for example, identical attributes to those identified by the advertiser 205), as well as what portion of the advertising opportunities may be, but are not required to be, used by other campaigns already booked or reserved (such as campaigns stored in the campaign log 270 which specify, for example, overlapping but not identical attributes to those identified by the advertiser 205). The campaign allocator 310 may use certain template or other techniques for allocating supply where an overlap exists.

Using this information, the campaign allocator 310 may determine a number of likely available advertising opportunities, as well as a price for establishing the advertising campaign. Where fewer advertising opportunities are available than were requested by the advertiser 205, the campaign allocator 310 may indicate to the advertiser 205 that a request cannot be met. In either situation, the campaign allocator 310 may provide the advertiser 205 with an offer and an available supply for establishing the advertising campaign.

In some embodiments where a smaller supply exists than was requested by the advertiser 205, the campaign allocator 310 may request that the advertiser 205 remove or otherwise modify one or more of the attributes or ad campaign requirements to further broaden or alter the number of ad opportunities. In some embodiments, prior to delivering this request to the advertiser 205, the campaign allocator 310 may request from the supply forecaster 320 an estimate of a supply if one or more of the attributes or ad campaign requirements were removed, and may return this estimate in a request to the advertiser 205. In other embodiments, the campaign allocator 310 may merely report whether it can accept or reject bookings based on the available inventory and the requested inventory.

If the advertiser 205 accepts the offer, the advertisements or other information for the advertiser 205 are gathered by the advertising system 140 and stored in the campaign log 270.

When a user, such as user 215 in FIG. 2, enters a search request, visits a web site, or otherwise generates an advertising opportunity, the ad serving system 260 may receive a request for an advertisement. The ad serving system 260 may gather information about the ad opportunity, such as the type of audience, the timing, the available space of an advertisement, etc., and may communicate with the campaign log 270 to identify an advertising campaign which meets the criteria of the advertising opportunity. An advertisement may be chosen from one or more ad campaigns which meet the criteria of the ad opportunity. For example, an ad campaign with attributes which match the ad opportunity may be selected. The chosen advertisement from the selected ad campaign may be sent from the campaign log 270 to the ad serving system 260, and then to the user 215 or the user application 220. Alternatively, the advertisement may be sent directly from the campaign log 270 to the user 215 or the user application 220. The ad serving system 260 may then record the service of the advertisement in the ad log 280. As mentioned the supply data 450 may later be updated with this data regarding this advertisement opportunity and impression, for use with future advertising campaign booking requests or inquiries.

In some situations, an advertiser 205 may request information, such as through a supply query, regarding an advertising campaign with multiple attributes for an attribute type. The query may have one or more attribute type-attribute pairs. For example, an advertiser 205 may wish to implement an advertising campaign with the attributes "Content Topic=Sports; Zipcode={12345, 23456}." Here, the attribute type "Zipcode" and multiple specified attributes (12345 and 23456). As another example, an advertiser may set up location targeting ad campaigns by specifying a list of zipcodes that the ad opportunities should satisfy. Advertisers may do this, for example, to set up highly-targeted and customized ad campaigns, which often result in complex campaign specifications in terms of attribute and/or value sets for specified attribute types.

The query server 410 and/or the data server 420A may thus require many steps, searches, processes, and/or individual queries based on a total number of attributes. For example, where a query includes 100 attributes for a first attribute type, and 40 attributes for a second attribute type, the searching process for this query may require 140 queries, searches, processes, and/or steps. For example, the query may be processed by first searching for each of the 100 attributes in the first attribute type individually, grouping all of the results together, and then searching those grouped results for each of the 40 remaining attributes. Such processing may be encoded in software and/or utilize or incorporate Boolean functions such as AND, OR, and NOT. Other ways of searching with one or more sets of attributes related to one or more attribute types are possible.

In circumstances where multiple attributes for an attribute type are specified or included in a query, issues may arise. Processing complex campaign queries accurately and in a performance-responsive manner may pose challenges. For example, the number of attributes requested by an advertiser 205 and/or queried about may be very large. In addition, processing complex queries may require probing an index multiple times. This may take a long time to process. Additionally, processing complex queries may require loading large portions of an index into memory. The large portions of the index may not fit in memory, and/or may cause unacceptable performance and/or lack of capability to process the query. As a result, consequences such as an inability to process the complex query, long latency to processing the complex query, and/or inefficient use of the system resource to process complex queries may result. In addition, limitations on an index such as the opportunity sample index 520 may require less complex queries.

As an example, a business such as a national retailer may consider running an advertising campaign, and may wish to target users from all zipcodes that they have stores in or are within a ten mile radius of their stores. The query may, for example, contain only two attribute types (for example, "content topic" and "Zipcode,"), but may have hundreds or thousands of attributes for the attribute type "Zipcode."

A system may attempt to process the query by getting answers for each attribute of the set of attributes for an attribute type individually, and then combining them to arrive at the overall answer. However, this may take a long time to probe the index for each of the many attributes and/or values and to combine the individual answers to get the overall answer. This may also require a lot of main memory to load all of the relevant parts of the index, so the data server process may not be able to find the matching supply for the query. Another possible result is that the system may devote resources to the complex query, but may bounce other users trying to run queries during the same compute time.

A system facing many of these problems may respond to the complex query in a number of other ways. For example, the query server may declare a failure to process the query request. In this case, the user may be forced to manually specify separate queries with smaller sets of attributes for one or more attribute types. Such a solution may not be time or cost efficient for the user. Alternatively, the system may timeout, since the query may take too long to process. Alternatively, the system may drop the specific condition involving the set of multiple attributes for an attribute type, and may process the rest of the query, in essence erasing the troublesome set of attributes. This result may be significantly different from the result of the original query, and may result in errors, particularly where the attribute and/or value set specified may be a small subset of the domain of the attribute.

An alternative to the above-described methods may be to sample the attribute set, thereby simplifying the query. For example, one may take a first complex query and generate a modified query that specifies a subset of the attributes from the set of attributes. The modified query may then be executed. The results of the modified query may then be extrapolated to derive a result which may be responsive to the original query.

Systems and methods of this nature may be designed to account for the presences of limitations of a core infrastructure of components of a forecasting engine, such as limitations in terms of size of value sets in queries, that can be handled by an indexing component (such as an opportunity sample index 520), limitations in terms of timing, limitations in terms of resources, and/or limitations in terms of processing capabilities. This may be done by identifying a relationship between a main-memory footprint of a forecasting engine and its ability to handle large queries, and designing a solution based on this relationship that allows more complex queries to be handled by an indexing engine through the use of appropriate main-memory settings. Additionally value lists may be truncated to ensure low-latency and high throughput query processing in a supply forecaster 320. Adjustment factors may also be employed to project sample weights to compensate for a limited resolution where a subset of values are considered. Additionally, tuning parameters may be employed that enable a system to maintain high performance while at the same time providing high accuracy in representing matching opportunities that are forecasted.

Figure 6:
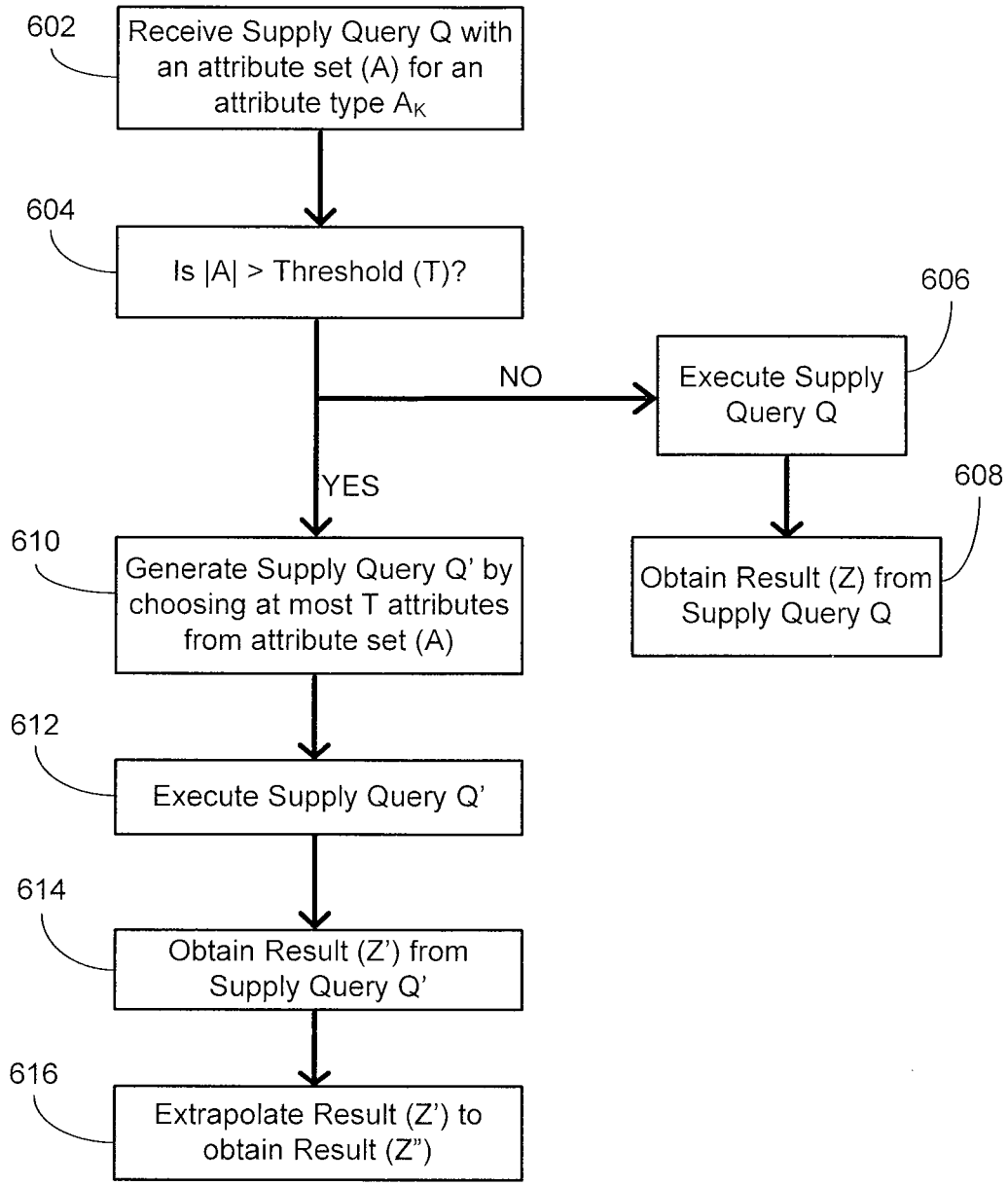
FIG. 6 is a flow diagram illustrating a method and system for processing queries.

FIG. 6 illustrates one method of processing queries with the above-described system. The method begins at step 602, where a supply query Q is received. The supply query Q may specify a set of attributes (A) that relate to an attribute type $A_K$. For example, a supply query may specify a set of attributes {12345, 23456, 34567, 45678, 56789, 65789} for the attribute type "Zipcode." The attribute type $A_K$ may be any of the possible attribute types discussed herein. The set of attribute (A) may be any size and/or contain any number of attributes, as well as various combinations of attributes and/or values relating to an attribute type. Alternatively or in addition, one or more additional sets of attributes and/or values relating to one or more additional attribute types may or may not be included in the supply query Q.

At step 604, the size of the attribute set (A) is compared to a threshold value (T).

The size of the attribute set (A), also denoted as |A|, may refer to the number of attributes specified in the set. For example, if attribute set (A)={12345, 23456, 34567, 45678, 56789, 65789}, then |A|=6. Other methods of determining the size of the attribute set (A) are possible.

The threshold value (T) may relate to a maximum number of attributes, or an attribute limit, which may be specified for the attribute type $A_K$, above which the system may not be able to process the query, the processing may take too long, or the processing may require too many resources or not have enough memory to handle. The threshold value (T) may be set to increase or maximize the likelihood that the system may be able to complete the query and timely respond with accurate results. In some embodiments, the threshold value (T) may not represent an actual limit on resources or time, but rather may represent an agreed and/or determined limit which the system and/or method may employ or otherwise use as a way of capping the query at a determined, designated, and/or reasonable maximum point for a query and/or attribute type.

In some systems, the threshold value (T) may be set based on a length of time and/or latency associated with executing the query Q. For example, the threshold value (T) may represent the maximum number, or a percentage of the maximum number, of attributes which may be included in a query before a query will not be able to be executed in a designated time and/or using a designated amount of resources. The designated time may, for example, be the length before receiving a time out error, or may be a time identified automatically by the system or manually by a user or administrator, after which results are no longer timely and/or after which a delay is no longer acceptable. The designated resources may, for example, be the number of attributes and/or individual queries required to be run, may be a number of servers and/or commands required, and/or may be any other physical or computational limit or boundary imposed automatically or manually.

As an example, the threshold value (T) may represent the number of attributes which, when included in a query, result in a latency period of 95% of a time out value. For example, if the system will time out after 10 ms, and if each attribute requires 0.1 ms of computing time, the threshold value (T) in this example would be:

$$T=0.95*(10/0.1)=95$$

In some systems, the threshold value (T) may be determined and/or calculated based on an amount of memory necessary to process the query. For example, a certain amount of memory may be required to store data and/or samples during, or for, any searches and/or queries conducted. Accordingly, it may be determined that an amount of queries over the threshold (T) may cause the query to fail, the system to slow, and/or divert too many resources from other tasks. In some embodiments, the threshold (T) may represent a percentage of such a limit, such as 95% of the limit, to provide a buffer or error amount before any failure, slowing, or diversion of resources.

In some systems, the threshold (T) may represent a number of attributes and/or individual queries run for a supply query Q which satisfy a percentage and/or accuracy goal of the system. For example, it may be determined and/or calculated that after the threshold number of attributes are considered, an extrapolation of results will yield a final result which may be acceptable to the system and/or user. Accordingly, in an effort to conserve resources, time, and storage space, the system may implement the threshold (T).

In some systems, the threshold value (T) may be determined by balancing a tradeoff between accuracy and performance, with a higher threshold resulting in higher accuracy and possibly longer times for computation and searching, while a smaller threshold (T) may result in lower accuracy but faster computation and/or searching. In other systems, the threshold value (T) may be arbitrarily and/or intentionally set without further calculation. Various other methods of calculating and/or determining the threshold value (T) may be used.

The threshold value (T) may be set and/or modified automatically or manually. The threshold value (T) may vary and/or be set different for each attribute type, and/or may vary depending on the advertiser and/or query.

Where $|A|$ is less than or equal to the threshold (T), the method proceeds to step 606, where the supply query Q is executed. Then, at step 608, a result (Z) is obtained from the supply query Q.

Steps 606 and 608 may be done without modifying the supply query Q from step 602. The supply query Q may be executed and results obtained, as previously described, by querying with the query server 410 each data server 420A-420N in parallel for supply data and/or samples deriving supply information from the returned results.

If, on the other hand, $|A|$ is greater than the threshold (T), the method may proceed to step 610. At step 610, a supply query Q' is generated. The supply query Q' may be a modified, adjusted, altered, and/or changed version of the supply query Q. The supply query Q' may be generated by considering the initial attribute set (A) provided with the supply query Q, and choosing at most T attributes from the attribute set (A). In this way, the new query Q' may have an attribute set (A') where $|A'|$ is not greater than the threshold value T. This may ensure that a controllable and/or executable number of attributes are incorporated into the query run by the query server 410.

Various methods may be used to select at most T attributes from the attribute set (A). In one method, the first T attributes of the attribute set (A) may be selected. In another method, a random set of T attributes may be selected from the attribute set (A). In another method, a set of T attributes of the attribute set (A) may be selected, such that the set of T attributes contains the attributes with the largest amount of total supply, such as those zipcodes with the largest population or number of opportunities generally. In another method, a set of T attributes may be selected using other criteria, such as by choosing T attributes which also have another attribute or fit other criteria. Various other methods are possible.

As noted in step 610, the new supply query Q' selects at most T attributes from the attribute set (A). Accordingly, the new supply query Q' is not limited to selecting precisely T attributes from the attribute set (A), but rather may select less than T attributes from the attribute set (A) as desired, required, and/or instructed.

Step 604 asks whether $|A|$ is greater than the threshold (T). Alternatively, step 604 may ask whether $|A|$ is equal to or greater than the threshold (T). In such a method, at step 610, the system may generate a supply query Q' by choosing at most T−1 attributes from the attribute set (A). The threshold (T) may represent either an acceptable upper limit on a number of attributes, or the lowest unacceptable limit on a number of attributes.

The method may then proceed to step 612, where the supply query Q' is executed. At step 614, a result (Z') is obtained from the supply query Q'. This may be done in a manner similar to steps 606 and 608.

The result (Z') may not represent a result to the supply query Q, since the result (Z') may be returned for the modified supply query Q'. In order to obtain results which may more accurately reflect results from the supply query Q, the result (Z') may be extrapolated in step 616 to obtain the result (Z"). The result (Z") may be an approximation of a result (Z) which may have been obtained had the original query Q been fully carried out.

The result (Z') may be extrapolated to obtain a result (Z") in a number of ways. In some methods, one may multiply the result (Z') by a ratio of $|A|$ to $|A'|$ (where, in systems where T values were chosen from the attribute set (A), the ratio is (|A|/T)). This may be useful, for example, where the at most T attributes were chosen at random, or, for example, the first T number of attributes from the attribute set (A) were chosen to create the new attribute set (A') for the new supply query Q'.

Alternatively, one may multiply a result (Z') by a ratio of a total weight of values from the original query to a total weight of attributes from the modified query. This may, for example, be useful where the at most T attributes chosen from the attribute set (A) were the at most T attributes with the largest weights. For example, where it is known that each attribute generally has a total number of ad opportunities (not necessarily matching with the attributes in the query, but rather a total number of ad opportunities available overall), one may extrapolate the result (Z') by multiplying it by a ratio of the sum of the total number of ad opportunities satisfying the attributes of the original attribute set over the sum of the total number of ad opportunities satisfying the attributes of the attribute set of the new query Q'.

For example, where an original attribute set (A)={W, X, Y, and Z}, it may be known that attributes W, X each have a weight of 2 and account for twice the possible ad opportunities of Y, Z, which may each have a weight of 1. For example, W and X may represent zip codes with twice the population of the zip codes Y and Z. In this case, the weight of (A) may be, for example, 6. Where a threshold value is 2, one may choose to run the new query Q' with (A')={W, X} to maximize the return on the search, since a larger number of ad opportunities may be searched. The weight of (A') may be 4 in this case. The result (Z') may then be extrapolated by multiplying by a ratio of the weight of (A) over the weight of (A'), which in this case would be by 6/4=1.5. Other variations and/or computations are possible.

As a numerical example of the method in FIG. 6, consider where a query Q requests advertisement opportunities related to "Content Topic: Sports, Zipcode={Z1 . . . Z10,000}," where the system has a threshold T=1000 for the attribute type "Zipcode." Here, because at step 604 the size of "Zipcode" is 10,000, which is greater than the threshold 1000, the method proceeds to step 610. A new query Q' is generated, requesting advertisement opportunities related to "Content Topic=Sports; Zipcode={Z1 . . . Z1,000}." Here, the first 1000 attributes for zipcode were chosen, but it should be emphasized that any of the above described methods of choosing at most T attributes could be employed. The new query Q' is executed, and the data servers return a result of 1 million advertising opportunities for the query Q'. The result of 1 million advertising opportunities, which represent Z', may then be extrapolated, such as by multiplying the result by the ratio of the size of the original attribute set (in this example, 10,000) over the size of the attribute set actually included in the new query Q' (in this example, 1,000). Accordingly, the new result may be 1 million*(10,000/1,000)=10 million advertising opportunities.

While the method of FIG. 6 includes step 604, this may not be required, and/or may be replaced by other steps. For example, some systems and methods may immediately go from step 602 to step 610, and may not include steps 604, 606, and 608. In some of these systems, T may be small enough that it an administrator or the system is assured that |A| will be greater than the threshold T.

Memory configuration may also be considered in balancing the tradeoff between accuracy and performance. A system may be configured with larger memory per data server process. This may increase the accuracy of complex-query results. Larger memory per data server process may result in fewer processes per data server machine, thereby increasing the latency and reducing throughput due to fewer index partitions.

Figure 7:
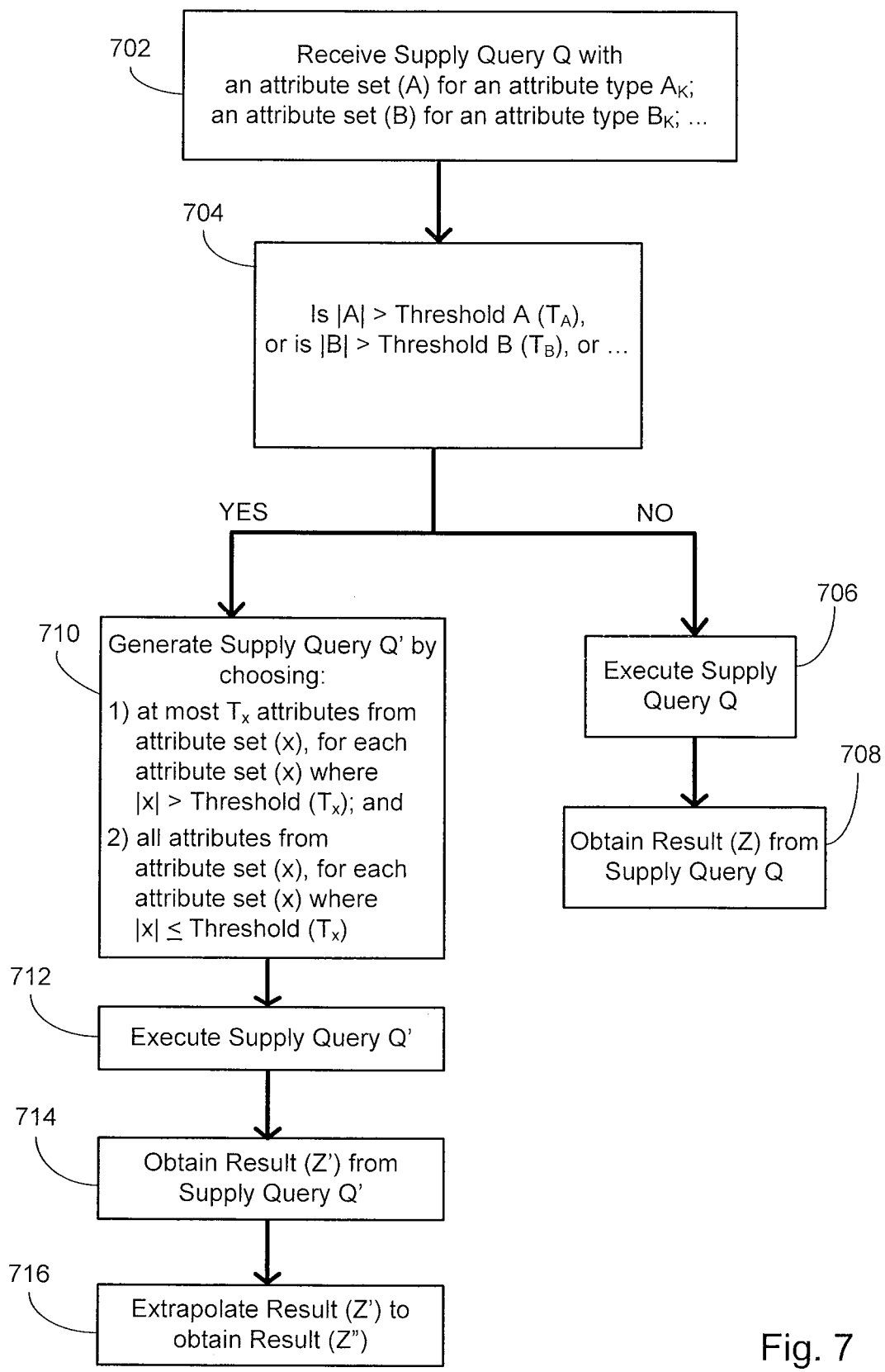
FIG. 7 is a flow diagram illustrating a method and system for processing queries.

FIG. 7 depicts another method which may be used for processing queries with this system. As mentioned above, a supply query Q may have a plurality of attribute sets, with each set related to one of a plurality of attribute types. In the method of FIG. 7, a supply query Q is received having attribute set (A) for an attribute type $A_K$, an attribute set (B) for an attribute type $B_K$, . . . Any number of attribute sets for an attribute type may be included. This supply query Q and attribute sets are received at step 702.

In step 704, the size of the attribute set (A) is compared with a threshold A ($T_A$). The comparison may be similar to the comparison carried out in step 604 of the method in FIG. 6. In addition, in step 704, the size of the attribute set (B) may be compared with a threshold B ($T_B$), . . . for each attribute set in the supply query Q. These comparisons may be similar or the same as the comparison carried out in step 604 of FIG. 6.

While FIG. 7 indicates that all of the attribute sets may be compared to a corresponding threshold value, in other systems, only the size of one or a portion of the attribute sets may be compared to threshold values. For example, in some systems, only the size of attribute sets (A) and (B) may be compared to threshold values TA and TB, while the remainder of the attribute sets may not be compared. Various combinations are possible.

Step 704 illustrates a method where the size of an attribute set is compared to a unique threshold value (such as $T_A$ for attribute set (A), $T_B$ for attribute set (B), etc.). Alternatively, in some systems, each of the attribute sets (A), (B), . . . may be compared to one universal threshold (T). This may be functionally equivalent or similar to step 704 where $T_A=T_B=$ . . . etc. In other systems, some of the attribute sets may be compared to a first threshold, while other attribute sets are compared to one or more other thresholds. Various combinations of comparisons and threshold values are possible.

Referring to step 704, if none of |A|, |B|, . . . etc. are larger than the corresponding threshold values $T_A$, $T_B$, . . . etc., the method proceeds to step 706, where the supply query Q is executed. This may be similar to the execution of the supply query Q in step 606 of the method of FIG. 6. Results (Z) may be obtained for the supply query Q in step 708. This may be done in a manner similar to how the result (Z) is obtained in step 608 in the method of FIG. 6.

If, on the other hand, any one of the sizes of the compared attribute sets |A|, |B|, . . . etc. are larger than the corresponding threshold values $T_A$, $T_B$, . . . etc., the method may proceed to step 710. At step 710, a new supply query Q' is created. Supply query Q' may be or represent a modified, adjusted, altered, and/or changed version of the supply query Q.

The supply query Q' may be created by choosing at most $T_x$ attributes from each attribute set (x) where |x| was greater than the threshold value $T_x$. For example, where |A| is greater than the threshold $T_A$, at most $T_A$ attributes may be chosen from the attribute set (A). The at most $T_A$ attributes selected may form or create a new attribute set (A'). Selection of the at most $T_A$ attributes may be conducted in a manner similar to the selection of at most T attributes in the method of FIG. 6.

The supply query Q' may be further created by choosing all of the attributes from the attribute set (x), for attribute sets (x) where |x| was not greater than the threshold value $T_x$. For example, where |B| is not greater than $T_B$, all attributes of the attribute set (B) may be selected. These may represent the original attribute set (B), and/or a new attribute set (B'). Alternatively, fewer attributes may be selected.

A resulting supply query Q' may include at most $T_x$ attributes from each attribute set (x) where |x| is greater than the threshold value $T_x$, and at most |x| attributes from each attribute set (x) where |x| is not greater than the threshold value $T_x$.

After the supply query Q' is created, the method may proceed to step 712, where the supply query Q' is executed. This may be done in a manner similar or the same as in step 612 of the method in FIG. 6, or in a different manner.

Then, the method may proceed to step 714 where a result (Z') may be obtained from supply query Q'. This step may be done in a manner similar or the same as in step 614 of the method in FIG. 6, or in a different manner.

The method may proceed to step 716, where the result (Z') may be extrapolated to obtain a result (Z"). The result (Z") in FIG. 7 may resemble the result (Z") in FIG. 6, in that both may be estimates and/or calculated results which may be intended to mimic and/or represent a result (Z) if the full supply query Q had been executed and/or processed.

Extrapolation of the result (Z') to obtain a result (Z") may be similar to the extrapolation of the results in step 616 of FIG. 6. In some systems and methods where multiple attribute sets are reduced, the result (Z') may be multiplied by multiple ratios.

For example, where a supply query Q requested information for "Content Topic={A1, . . . A400}; Zipcode={B1, . . . B800}" and where a threshold value for the content topic ($T_{CT}$) is 200 and the threshold value for the zipcode ($T_{ZC}$) is 80, a new supply query Q' may be generated with "Content Topic={A1, . . . A200}; Zipcode={B1, . . . B80}. The result of the new supply query Q' may be result (Z'). Extrapolating the result (Z') may be calculated as follows:

$$Z|=Z'^*(|CT|/T_{CT})^*(|ZC|/T_{ZC})=Z'^*(400/200)^* (800/80)=Z'^*20$$

As mentioned, in this simplified example, the selection of at most T attributes was carried out by taking the first T attributes, but other ways are possible. Additionally, extrapolation in this simplified example was carried out using a ratio of the size of the attribute set to the size of the actual selected attribute set, but other methods of extrapolation, such as those using weights, are possible.

Figure 8:
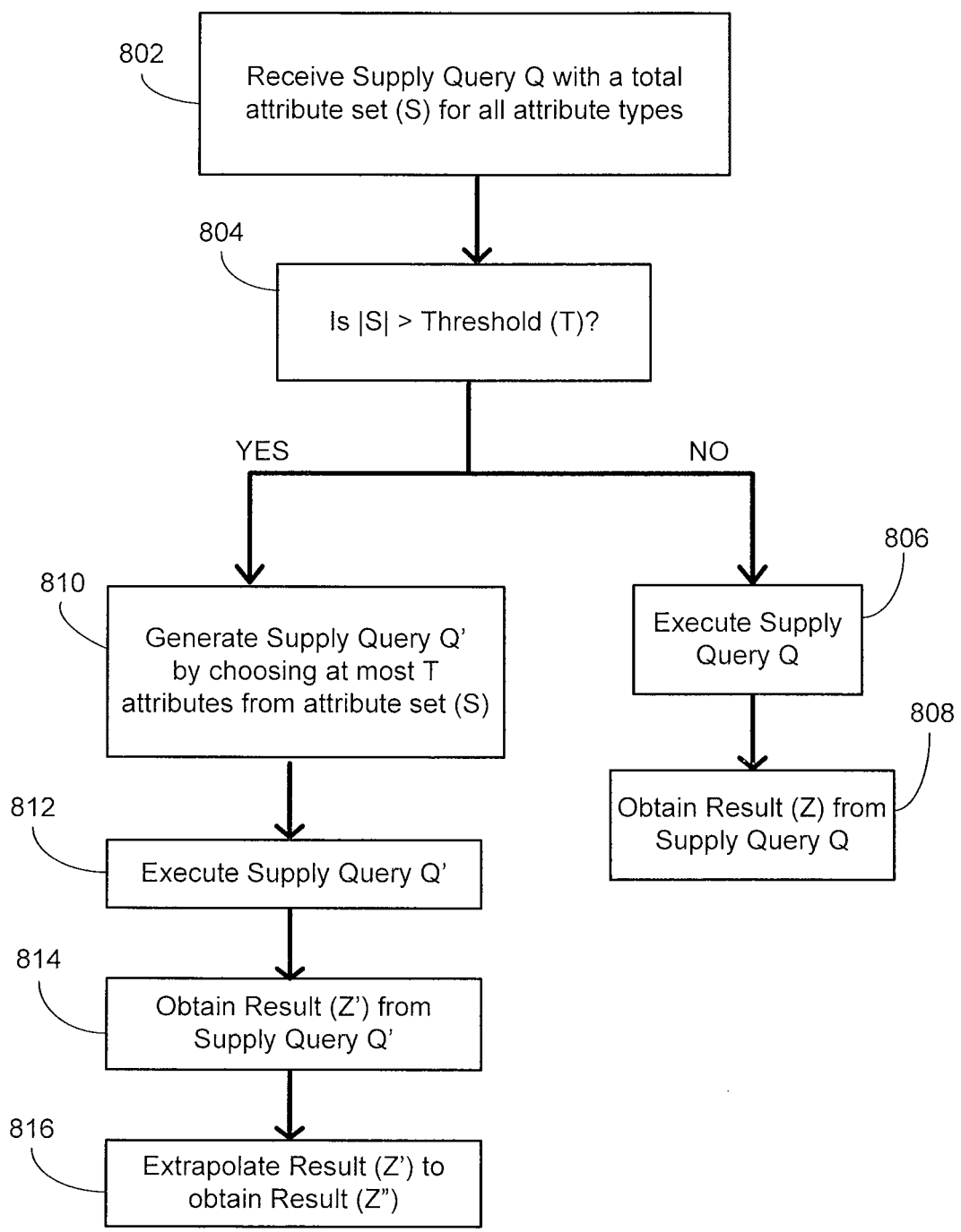
FIG. 8 is a flow diagram illustrating a method and system for processing queries.

FIG. 8 illustrates another method of using the system described herein for processing queries. While the methods of FIG. 6 and FIG. 7 may consider thresholds for the size of attribute sets directed to one or more attribute types, the method of FIG. 8 may differ in that the method of FIG. 8 may consider a total number of specified attributes over all attribute types.

The method of FIG. 8 may begin at step 802, where a supply query Q is received. The supply query Q may have a total attribute set (S) which may include all attributes for all attribute types. For example, a supply query may specify "Gender=Female; Zipcode={12345, 23456}" In this example, the total attribute set (S)={female, 12345, 23456}. The size of the total attribute set (S), denoted as |S|, would be 3. Any number of attribute types and attributes may be specified.

At step 804, the size of the attribute set (S) is compared to a threshold (T). If |S| is not greater than the threshold (T), the method proceeds to step 806, where the supply query Q is executed. This may be done in a manner similar to or the same as the execution of the supply query Q described in step 606 of the method of FIG. 6.

At step 808, a result (Z) is obtained from the executed supply query Q. This may be done in a manner similar to or the same as obtaining the results from supply query Q in step 608 of the method in FIG. 6.

Returning to step 804, if |S| is greater than the threshold (T), the method proceeds to step 810. At step 810, a new supply query Q' is generated. The new supply query Q' may be an adjusted, modified, altered, or otherwise changed version of the supply query Q, or may be independent of Q. The new supply query Q' may be generated by choosing at most T attributes from the attribute set (S). In this way, the size of the attribute set for the new supply query Q' will not be greater than the threshold value T.

There may be a number of ways of selecting at most T attributes from the attribute set (S). The attributes from the attribute set (S) may refer and/or relate to one or multiple attribute types. Where the attributes from the attribute set (S) all relate to only one attribute type, the at most T attributes may be selected in any manner described above, such as, for example, randomly, choosing the first T attributes, and/or selectively. Execution of the method where the attribute set (S) refers or relates to attributes only for one attribute type may, for example, resemble execution of the method of claim 6.

Where the attributes from the attribute set (S) relate to more than one attribute type, selecting the at most T attributes may be done in various other ways. For example, one may start with the first attribute type and select attributes from that attribute type in order until either T attributes have been selected or all of the attributes from the first attribute type have been selected. If all of the attributes from the first attribute type have been selected, one may proceed to the second attribute type and pick attributes from the second attribute type until a total of T attributes have been selected, or until all of the attributes from the second attribute type have been selected. This process may be repeated until T attributes have been selected.

Alternatively, the at most T attributes may be selected randomly from the attribute set (S), irrespective of what attribute type the attributes relate to.

Alternatively, the at most T attributes may be selected proportionally from each of the attribute types. The proportional selection may be based on the number of attributes for each attribute type. For example, for a new supply query Q', the system may select [(T/|S|)*number of attributes specified for each attribute type] from each attribute type. Within each attribute type, the attribute selected may be selected in any method described above, such as, for example, randomly, choosing the first T attributes, and/or selectively.

Alternatively, the at most T attributes may be selected proportionally from a total number of attributes possible. For example, a new supply query Q' may be generated or created by selecting [(T/total number of attributes possible for all attribute types)*number of attributes specified for each attribute type] from each attribute type. Various other methods of selecting the at most T attributes are possible.

After the supply query Q' is created, the method may proceed to step 812, where the supply query Q' is executed. This may be done in a manner similar or the same as in step 612 of the method in FIG. 6, or in a different manner.

Then, the method may proceed to step 814 where a result (Z') may be obtained from supply query Q'. This step may be done in a manner similar or the same as in step 614 of the method in FIG. 6, or in a different manner.

The method may proceed to step 816, where the result (Z') may be extrapolated to obtain a result (Z"). This extrapolation may be similar to the extrapolation in step 716 of the method in FIG. 7.

Figure 9:
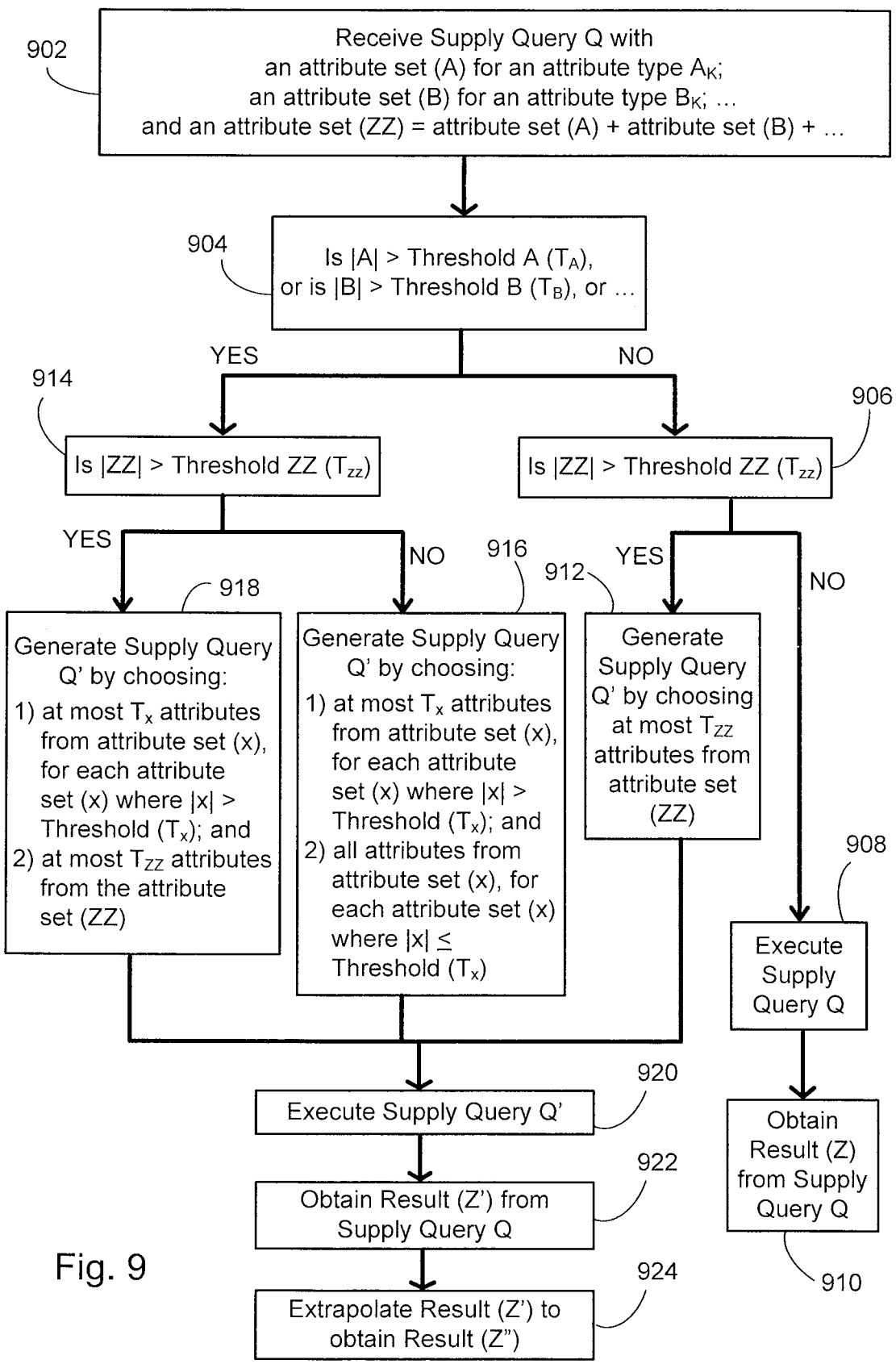
FIG. 9 is a flow diagram illustrating a method and system for processing queries.

FIG. 9 illustrates another method of processing queries using the systems described herein. The method begins at step 902 where a supply query Q is received. The supply query may be like the supply query in FIG. 7 in that the supply query may have attribute set (A) for an attribute type $A_K$, an attribute set (B) for an attribute type $B_K$, etc. The sum of all of the attribute sets (A), (B), ... may be defined as attribute set (ZZ). In some systems and methods, the supply query Q of FIG. 9 may resemble the supply query Q in FIG. 7.

In step 904, as in step 704 of FIG. 7, the size of the attribute sets (x) are compared to threshold values ($T_x$). For example, |A| is compared to threshold value ($T_A$), |B| is compared to threshold value ($T_B$), etc. This may be done in a manner similar or the same as in step 704 of FIG. 7.

If none of the sizes of the attribute sets are greater than a corresponding threshold, the method proceeds to step 906 where the size of the total attribute set (ZZ) is compared to a threshold ZZ ($T_{ZZ}$). Where |ZZ| is not greater than the threshold ZZ ($T_{ZZ}$), the method proceeds to step 908, where the supply query Q is executed. This may be done in a manner similar to or the same as the execution of the supply query Q described in step 606 of the method of FIG. 6.

At step 910, a result (Z) is obtained from the executed supply query Q. This result (Z) may be obtained in a manner similar to or the same as obtaining the results from supply query Q in step 608 of the method in FIG. 6.

Returning to step 906, if |ZZ| is greater than the threshold ($T_{ZZ}$), the method may proceed to step 912. At step 912, a new supply query Q' may be generated by choosing at most $T_{ZZ}$ attributes from the attribute set (ZZ). This may be done in a manner similar to the selection of at most T attributes in step 810 of the method in FIG. 8.

After the supply query Q' is generated, the method may proceed to step 920, where the supply query Q' is executed. This may be done in a manner similar or the same as in step 712 of the method in FIG. 7, or in a different manner.

Then, the method may proceed to step 922 where a result (Z') may be obtained from supply query Q'. This step may be done in a manner similar or the same as in step 714 of the method in FIG. 7, or in a different manner.

The method may proceed to step 924, where the result (Z') may be extrapolated to obtain a result (Z"). This extrapolation may be similar to the extrapolation in step 716 of the method in FIG. 7.

Returning to step 904, if any of the sizes of the attribute sets (A), (B), ... are greater than the corresponding thresholds $T_A$, $T_B$, ..., the method may proceed to step 914. In step 914, |ZZ| is compared to a threshold ZZ ($T_{ZZ}$). This may be the same or similar to the comparison in step 906.

Where |ZZ| is not greater than the $T_{ZZ}$, the method proceeds to step 916, where a new supply query Q' may be generated. In the newly generated supply query Q', for each attribute set (x) where |x| is greater than a corresponding threshold value $T_x$, at most $T_x$ attributes from the attribute set (x) may be chosen. The selected attributes may form a new attribute set (x'). The attributes may be selected in a manner similar to the selection of attributes in step 710 of the method of FIG. 7. For all of the attribute sets (x) where |x| is not greater than a corresponding threshold value $T_x$, all of the attributes from the attribute set (x) may be chosen, or fewer than all of the attributes may be chosen. This step 916 may be similar to or the same as step 710 in the method of FIG. 7.

After the new supply query Q' is generated, the method may proceed to steps 920, 922, and 924 as described above.

Returning to step 914, where |ZZ| is greater than the $T_{ZZ}$, the method proceeds to step 918. In step 918, a new supply query Q' may be generated. In generating the new supply query Q', at most $T_x$ attributes may be chosen from every attribute set (x) where |x| was greater than the corresponding threshold ($T_x$). In addition, at most $T_{ZZ}$ attributes total may be selected.

Generation of the new supply query Q' may be done in any number of ways in step 918. In one method, first, $T_{ZZ}$ attributes are selected from the total attribute set ZZ, and then $T_x$ attributes are selected from each attribute set (x) where |x| was greater than the corresponding threshold ($T_x$). In another method, first, $T_x$ attributes are selected from each attribute set (x) where |x| was greater than the corresponding threshold $T_x$, and then $T_{ZZ}$ attributes are selected from the all of the attributes remaining in the attribute set ZZ. In a third method, logic or rules may be implemented so that both selected are conducted simultaneously and in accordance with each other.

In the method of FIG. 9, steps 906 and 914 may be similar or the same. In some systems or methods, step 904 may be flip-flopped with steps 906 and 914. In these systems and methods, step 918 is conducted when at least one of the sizes of the attribute sets (A), (B), ... is greater than the corresponding thresholds $T_A$, $T_B$, ..., and the size of the total attribute set (ZZ) is greater than the threshold $T_{ZZ}$. In these systems and methods, step 916 may be conducted when at least one of the sizes of the attribute sets (A), (B), ... is greater than the corresponding thresholds $T_A$, $T_B$, ..., and the size of the total attribute set (ZZ) is not greater than the threshold $T_{ZZ}$. In these systems and methods, step 912 may be conducted when none of the sizes of the attribute sets (A), (B), ... is greater than the corresponding thresholds $T_A$, $T_B$, ..., but the size of the total attribute set (ZZ) is greater than the threshold $T_{ZZ}$. In these systems and methods, step 906 may be conducted when none of the sizes of the attribute sets (A), (B), ... is greater than the corresponding thresholds $T_A$, $T_B$, ..., and the size of the total attribute set (ZZ) is not greater than the threshold $T_{ZZ}$.

Some methods may deviate from the method of FIG. 9 in various other ways. For example, in one alternative method, after step 904 is conducted, a new supply query Q" may be constructed by selecting, for each of the attribute sets where the size of the attribute set is greater than the corresponding threshold T, at most T attributes, so that the new query Q" has a total attribute set of (Q") with a size of |Q"|. In this method, step 914 may be replaced by instead comparing |Q"| with the threshold $T_{ZZ}$. In this method, step 916 may be eliminated, such that if |Q"| is not greater than $T_{ZZ}$, the method may proceed directly to step 920, 922, and 924. Additionally, if |Q"| is greater than $T_{ZZ}$, step 918 may be replaced by a step where a new supply query Q' is created by choosing at most $T_{ZZ}$ attributes from the attribute set (Q"), after which the method proceeds to step 920, 922, and 924. Selection of the at most $T_{ZZ}$ attributes may be similar to step 810 in FIG. 8.

In another alternative method, step 904 is replaced by the comparison of |ZZ| to the threshold $T_{ZZ}$. Where |ZZ| is not greater than the threshold $T_{ZZ}$, the method may proceed to a step reciting the comparison of the size of each of the attribute sets (A), (B), ... with the corresponding thresholds $T_A$, $T_B$, .... Where none of the sizes of the attribute sets are greater than the corresponding thresholds, the method may proceed to steps 908 and 910 as in FIG. 9. Where at least one of the attribute sets (A), (B), ... is greater than the corresponding thresholds $T_A$, $T_B$, ..., the method may proceed to step 916, and then 920, 922, and 924 as in FIG. 9. If, in step

904, |ZZ| is greater than the threshold $T_{ZZ}$, a new supply query Q" may be created by selecting at most $T_{ZZ}$ attributes from the total attribute set (ZZ). Because some of the original attribute sets may be modified by selecting only $T_{ZZ}$ attributes from the total attribute set (ZZ), the resulting new supply query Q" may have altered attribute sets (A"), (B"). . . . In step 914, the size of each of these altered attribute sets (A"), (B"), . . . may be compared to the threshold values $T_A$, $T_B$, etc. Where none of the sizes of the altered attribute sets are greater than the corresponding thresholds, one may consider the new supply query Q" to be equal to supply query Q', and may proceed to steps 920, 922, and 924 of the method of FIG. 9. Where, however, any of the sizes of the altered attribute sets are greater than the corresponding thresholds, a new supply query Q' may be created by selecting at most $T_x$ attributes from each of the attribute sets (x"), and |x"| or fewer attributes from all other altered attribute sets (x"). The method may then proceed to steps 920, 922, and 924 as in FIG. 9. Other possible methods are possible.

While the above described methods and systems may refer to a comparison and/or determination as to whether one element is greater than or equal to a second element, in some embodiments one or more of these comparisons may be replaced by a comparison and/or determination as to whether one element is greater than a second element. Similarly, comparisons and/or determinations described as being "greater than" may also be replaced with "greater than or equal to." While the above described methods may refer to a comparison and/or determination as to whether one element is less than or equal to a second element, in some embodiments one or more of these comparisons may be replaced by a comparison and/or determination as to whether one element is less than a second element. Similarly, comparisons and/or determinations described as being "less than" may also be replaced with "less than or equal to." Comparisons and/or determinations made which require an element to "exceed" a second element may be replaced by comparisons and/or determinations which require an element to "exceed or equal" a second element, and vice versa.

As described herein, an ad impression may be deemed to match attributes or ad campaign requirements when the ad impression has all of the attributes or ad campaign requirements. However, in some embodiments, it may be possible for the advertising system to allow for an advertiser to rank attributes or ad campaign requirements, or otherwise delineate between absolutely necessary attributes or ad campaign requirements and preferred, but perhaps not required, attributes or ad campaign requirements. In such embodiments, ad impressions may be deemed matches if all of the absolutely necessary attributes are or ad campaign requirements are met, or if a certain portion of ranked attributes or ad campaign requirements are met.

All or a portion of the system may be automatically or manually configured to operate based on a determined accuracy, latency, and/or CPU/memory utilization. For example, threshold values may be determined, estimated, and/or calculated based on a determined accuracy, latency, and/or CPU/memory utilization, as well as other features.

The above described systems and methods may provide numerous benefits. Queries which may otherwise be complex, require extensive resources, and/or take a long time to process may be completed in a fraction of the time with minimal sacrifice in precision or accuracy. Such systems and methods may allow for fewer time out errors and/or less manual/user manipulation of terms and/or queries. Additionally, these systems and methods may allow for more queries to be processed in parallel and/or using similar or the same resources at the same time. More complex queries may be handled by the indexing engine as well, such as by appropriate main-memory settings. These systems and methods ensure low-latency and high throughput query processing. In addition, adjustment factors can be used to project the sample weights to compensate for the limited resolution when considering only a subset of values.

The methods and systems described herein may be used, for example, with inventory management systems for display advertising. The methods and systems described herein may not be limited to use with advertisements or with only online media. The methods and systems may be used with any system or model involving data or other information where a request is made to forecast a supply. For example, the methods and systems herein may be used to forecast room or seating on flights or other travel, or seating at events, like ballgames, or in other areas such as schooling or businesses. In some embodiments like these, the ad opportunities may instead be opportunities for seating availability or other availability, such as the availability of a product or service.

As mentioned the above described systems and/or methods may be part of, conducted by, implemented in, configurations of, employed by, and/or run using any one or more of the advertising system 140, the inventory management system 250, the ad serving system 260, campaign allocator 310, the supply forecaster 320, the query server 410, one or more data servers 420A-420N, and/or any of the data in the ad logs 280, campaign logs 270, and/or supply data 450, as well as the opportunity sample index 520 and forecasting model 510.

Figure 10:
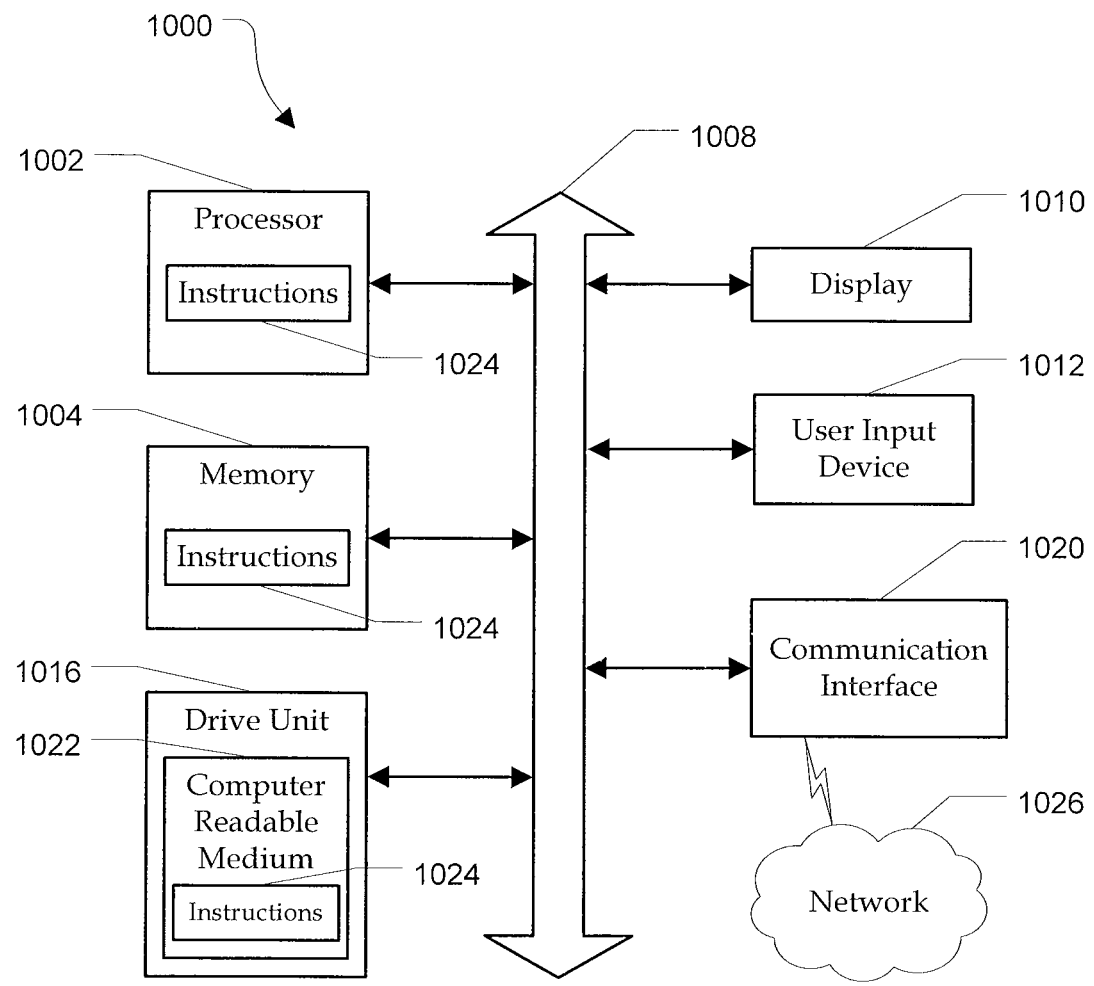
FIG. 10 is a block diagram of an exemplary processing system for executing advertisement impression distribution systems and methods.

The advertisement system 140 and client applications 115, 125A-125N may be one or more computing devices of various kinds, such as the computing device in FIG. 10. FIG. 10 illustrates an embodiment of a general computer system designated 1000. Any of the components from the system 100 may include the computer system 1000, such as the web application 125A, the standalone applications 115, 125B, the mobile application 125N, the advertising system 140, the ad serving system 260, the campaign log 270, the ad log 280, the inventory management system 250, the campaign allocation 310, the supply forecasting 320, the query server 410, the forecasting model 510, the opportunity samples 520, and/or any of the data servers 420A-420N. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1004 includes a cache or random access memory for the processor 1002. In alternative embodiments, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

As shown, the computer system 1000 may further include a display unit 1010, such as a liquid crystal display (LCD), an organic light emitting diode (OLED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1016.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the computer system 1000.

In a particular embodiment, as depicted in FIG. 10, the computer system 1000 may also include a disk or optical drive unit 1016. The disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the memory 1004 and/or within the processor 1002 during execution by the computer system 1000. The memory 1004 and the processor 1002 also may include computer-readable media as discussed above.

The present disclosure contemplates a computer-readable medium that includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000, or combinations thereof. The connection with the network 1026 may be a physical connection, such as a wired Ethernet connection or may be established wirelessly as discussed below. Likewise, the additional connections with other components of the system 1000 may be physical connections or may be established wirelessly. The network 1026 may alternatively be directly connected to the bus 1008.

The network 1026 may include wired networks, wireless networks, or combinations thereof. The wireless network may be a cellular telephone network, an 802.11, 802.16, 802.20, or WiMax network. Further, the network 1026 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of processing a supply query using parallel processing to load-balance data server requests, comprising:
   determining a maximum processing time for executing supply queries, wherein the maximum processing time is based on an available amount of system resources;
   determining a maximum number of advertising targeting attributes capable of being processed in a single supply query to a data server within the maximum processing time;
   receiving a first supply query comprising a request for advertising opportunities and specifying a first set of advertising targeting attributes, wherein a first size of the first set of advertising targeting attributes is greater than the maximum number of advertising targeting attributes capable of being processed in a single supply query to a data server;
   generating a plurality of second supply queries from the first supply query by selecting a plurality of subsets of advertising targeting attributes from the first set of advertising targeting attributes,
   wherein each of the plurality of subsets of advertising targeting attributes comprises a subset of advertising targeting attributes selected from the first set of advertising targeting attributes,
   wherein a second size of each of the subsets of advertising targeting attributes is less than the maximum number of advertising targeting attributes capable of being processed in a single supply query to a data server; and
   executing the plurality of second supply queries in parallel by delivering each supply query to a respective data server to obtain a plurality of second results.

2. A system for processing a supply query using parallel processing to load-balance data server requests, comprising:
   a query server comprising a non-transitory computer readable storage medium having stored therein data representing instructions executable by a programmed processor for processing a supply query, the storage medium comprising:
      instructions for determining a maximum number of targeting criteria capable of being processed in a single supply query to a data server within a designated maximum processing time;

instructions for receiving a first supply query comprising a first set of query terms indicating a plurality of targeting criteria for the first supply query, wherein a first number of the plurality of targeting criteria is greater than the maximum number of targeting criteria capable of being processed in a single supply query to a data server;

instructions for generating a plurality of second supply queries comprising second sets of query terms selected from the first set of query terms, wherein each of the second sets of query terms indicates a second subset of targeting criteria having a second number of targeting criteria that is not greater than the maximum number of targeting criteria; and instructions for executing the plurality of second supply queries in parallel to obtain a second result be delivering each of the plurality of second supply queries to a respective data server to obtain a plurality of second results.

3. A method of processing a supply query using parallel processing comprising:

receiving a first supply query, the first supply query comprising a request for advertising opportunities and indicating a first set of targeting attributes related to a first targeting attribute type, a second set of targeting attributes related to a second targeting attribute type, and a total targeting attribute set comprising all targeting attributes in the first supply query, wherein the first targeting attribute type and second targeting attribute types are different targeting attribute types;

comparing a size of the first set of targeting attributes to a first threshold value representing a maximum number of targeting attributes related to the first targeting attribute type;

comparing a size of the second set of targeting attributes to a second threshold value representing a maximum number of targeting attributes related to the second targeting attribute type;

generating a first supply query by selecting a first subset of targeting attributes from the first set of targeting attributes having a first subset size that is less than the first threshold value representing the maximum number of targeting attributes related to the first targeting attribute type;

generating a second supply query by selecting a second subset of targeting attributes from the second set of targeting attributes having a second subset size that is less than the second threshold value representing the maximum number of targeting attributes related to the second targeting attribute type;

executing the first and second supply queries in parallel to obtain a first result and a second result.

4. The method of claim 1, wherein the maximum processing time is determined based on an accuracy goal for responding to the first supply query with representative advertising opportunities.

5. The method of claim 1, wherein the maximum processing time is determined based on a latency time associated with processing the single supply query to the data server.

6. The method of claim 1, further comprising extrapolating the plurality of second results, wherein extrapolating comprises multiplying the plurality of second results by a ratio of the first size of the first set of advertising targeting attributes to the second size of each of the subsets of advertising targeting attributes.

7. The method of claim 1, further comprising extrapolating the plurality of second results, wherein extrapolating comprises multiplying the plurality of second results by a ratio of a total weight of the first set of advertising targeting attributes to a total weight of the plurality subsets of advertising targeting attributes.

8. The method of claim 1, wherein the first set of advertising targeting attributes comprises all attributes included in the first supply query.

9. The method of claim 1, wherein a first advertising targeting attribute from the first set of advertising targeting attributes is related to a first targeting criterion type, and a second targeting attribute from the first set of advertising targeting attributes is related to a second targeting criterion type.

10. The method of claim 1, where generating a plurality of second supply queries from the first supply query comprises:

generating a third supply query comprising a third set of advertising targeting attributes related to a first targeting attribute type and selected from the first set of advertising targeting attributes; and generating a fourth supply query comprising a fourth set of advertising targeting attributes related to a second targeting attribute type and selected from the first set of advertising targeting attributes.

11. The method of claim 1, wherein the maximum processing time is determined based on an amount of memory necessary to process the query.

12. The method of claim 1, wherein the plurality of subsets of advertising targeting attributes consist of randomly selected advertising targeting attributes from the first set of advertising targeting attributes.

13. The method of claim 1, wherein a size (n) of each of the plurality of subsets of advertising targeting is less than or equal to a threshold value, and wherein the threshold value represents a maximum number of advertising targeting attributes capable of being processed in a single supply query to a data server.

14. The system of claim 2, further comprising:

a data server that stores advertisement opportunity information and is configured to return, upon receiving instructions for execution of a supply query from a query server, a portion of the advertisement opportunity information related to the supply query.

15. The system of claim 2, wherein the storage medium further comprises instructions for extrapolating the second result by multiplying the second result by a ratio of the number of the first set of query terms to a number of the second sets of query terms.

16. The system of claim 2, wherein the storage medium further comprises instructions for extrapolating the second result by multiplying the second result by a ratio of a total weight of the first set of query terms to a total weight of the second sets of query terms.

17. The system of claim 2, wherein the first set of query terms comprises all query terms included in the first supply query.

18. The system of claim 2, wherein a first query term from the first set of query terms is related to a first attribute type, and a second query term from the first set of query terms is related to a second query term type.

19. The method of claim 3, further comprising extrapolating the second result.

20. The method of claim 3, wherein the first threshold value is determined based on an accuracy goal for responding to the query.

21. The method of claim 3, wherein the first threshold value is determined based on an amount of memory necessary to process the query.

22. The method of claim 3, further comprising determining a maximum number of targeting attributes capable of being processed in a single supply query to a data server within a designated maximum processing time.

23. The method of claim 10, wherein executing the plurality of second supply queries in par further comprises:
   executing the third supply query to obtain a third result related to the first targeting attribute type; and
   executing the fourth supply query to obtain a fourth result related to the second targeting attribute type.

24. The method of claim 19, wherein extrapolating comprises multiplying the second result by:
   a ratio of the size of the first set of targeting attributes to the first subset size of the first subset of targeting attributes; and
   a ratio of the size of the second set of targeting attributes to the second subset size of the second subset of targeting attributes.

25. The method of claim 22, wherein the size of the first set of targeting attributes and the size of the second set of targeting attributes are selected to be less than the maximum number of targeting attributes capable of being processed in a single supply query to a data server.

\* \* \* \* \*